(12) United States Patent
Smith et al.

(10) Patent No.: US 9,639,974 B2
(45) Date of Patent: *May 2, 2017

(54) IMAGE TRANSFORMATION SYSTEMS AND METHODS

(71) Applicant: FACECAKE MARKETING TECHNOLOGIES, INC., Calabasas, CA (US)

(72) Inventors: Linda Smith, Woodland Hills, CA (US); Clayton Nicholas Graff, Studio City, CA (US); John Szeder, Davis, CA (US)

(73) Assignee: Facecake Technologies, Inc., Calabasas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/719,174

(22) Filed: May 21, 2015

(65) Prior Publication Data

US 2015/0254892 A1    Sep. 10, 2015

Related U.S. Application Data

(63) Continuation of application No. 12/714,518, filed on Feb. 28, 2010, now Pat. No. 9,064,344.

(Continued)

(51) Int. Cl.
| | | |
|---|---|---|
| G06T 15/00 | (2011.01) |
| G06T 15/20 | (2011.01) |
| G06T 13/40 | (2011.01) |
| G06T 13/80 | (2011.01) |
| G06T 15/04 | (2011.01) |
| G06T 7/00 | (2017.01) |
| G06T 13/20 | (2011.01) |

(52) U.S. Cl.
CPC .......... *G06T 15/205* (2013.01); *G06T 7/0042* (2013.01); *G06T 7/0051* (2013.01); *G06T 13/20* (2013.01); *G06T 13/40* (2013.01); *G06T 13/80* (2013.01); *G06T 15/04* (2013.01); *G06T 2207/10004* (2013.01)

(58) Field of Classification Search
None
See application file for complete search history.

(56) References Cited

U.S. PATENT DOCUMENTS

| 7,091,976 B1 | 8/2006 | Ostermann et al. |
| 2001/0017937 A1 | 8/2001 | Bonnefous |

(Continued)

FOREIGN PATENT DOCUMENTS

JP    2007-156945 A    6/2007

*Primary Examiner* — Peter Hoang
(74) *Attorney, Agent, or Firm* — Manatt, Phelps & Philllips LLP

(57) ABSTRACT

Systems, methods, apparatuses, and computer readable medium are provided that cause a two dimensional image to appear three dimensional and also create a dynamic or animated illustrated images. The systems, methods, apparatuses and computer readable mediums implement displacement maps in a number of novel ways in conjunction with among other software, facial feature recognition software to recognize the areas of the face and allow the users to then customize those areas that are recognized. Furthermore, the created displacement maps are used to create all of the dynamic effects of an image in motion.

13 Claims, 22 Drawing Sheets

Related U.S. Application Data

(60) Provisional application No. 61/156,537, filed on Mar. 1, 2009.

(56) References Cited

U.S. PATENT DOCUMENTS

| | | | |
|---|---|---|---|
| 2002/0041285 A1* | 4/2002 | Hunter et al. | 345/474 |
| 2003/0046160 A1 | 3/2003 | Paz-Pujalt et al. | |
| 2007/0174775 A1* | 7/2007 | McAlpine et al. | 715/723 |
| 2008/0071507 A1 | 3/2008 | Hodgins et al. | |
| 2009/0132371 A1* | 5/2009 | Strietzel et al. | 705/14 |

* cited by examiner

IMAGE TRANSFORMATION SYSTEMS AND METHODS

RELATED APPLICATIONS

This application is a Continuation of U.S. application Ser. No. 12/714,518 filed Feb. 28, 2010, which is incorporated herein by reference in its entirety for all purposes. This application also claims priority from U.S. Provisional Application Ser. No. 61/156,537 filed Mar. 1, 2009, which is incorporated herein by reference in its entirety for all purposes.

FIELD

The present invention relates generally to image transformation and, more particularly, but not exclusively, to systems and methods for transforming a two dimensional static image into a three dimensional image, including, in some embodiments, animation of the three dimensional image.

BRIEF SUMMARY

Systems and methods are disclosed for transforming a two dimensional image into a three dimensional image by locating features on the two dimensional image, executing facial feature recognition software which characterizes the features on the two dimensional image, optionally identifying potentially moving elements other than facial features, generating displacement maps based on the characterization of the features and the moving elements, creating a motion system based on the displacement maps, and causing the two dimensional image to animate based on the motion system. In preferred embodiments, a computer based system implements the image transformation.

Displacement mapping is an alternative computer graphics technique in contrast to bump mapping, normal mapping, and parallax mapping, using a (procedural-) texture- or height-map to cause an effect where the actual geometric position of points over the textured surface are displaced, often along the local surface normal, according to the value the texture function evaluates to at each point on the surface. It gives surfaces a great sense of depth and detail, permitting in particular self-occlusion, self-shadowing and silhouettes.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of currently preferred embodiments, reference is made to the following Detailed Description, which is to be read in association with the accompanying drawings, wherein.

DETAILED DESCRIPTION OF THE PREFERRED EMBODIMENTS

Currently preferred embodiments of the image transformation systems and methods are described more fully hereinafter with reference to the accompanying drawings, which form a part hereof, and which show, by way of illustration, exemplary embodiments. The invention may, however, be embodied in many different forms and should not be construed as limited to the embodiments set forth herein. Rather, the disclosed embodiments are provided so that this disclosure will be thorough and complete, and will fully convey the scope of the invention to those skilled in the art. Among other things, the present invention may be embodied as methods or devices or combinations thereof. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." The term "coupled" implies that the elements may be directly connected together or may be coupled through one or more intervening elements.

Briefly, the disclosed embodiments are directed to systems, methods, apparatuses, and computer readable mediums containing software which when executed transform a two dimensional image into a three dimensional image, optionally with animation.

Illustrative Operating Environment

Figure 1:
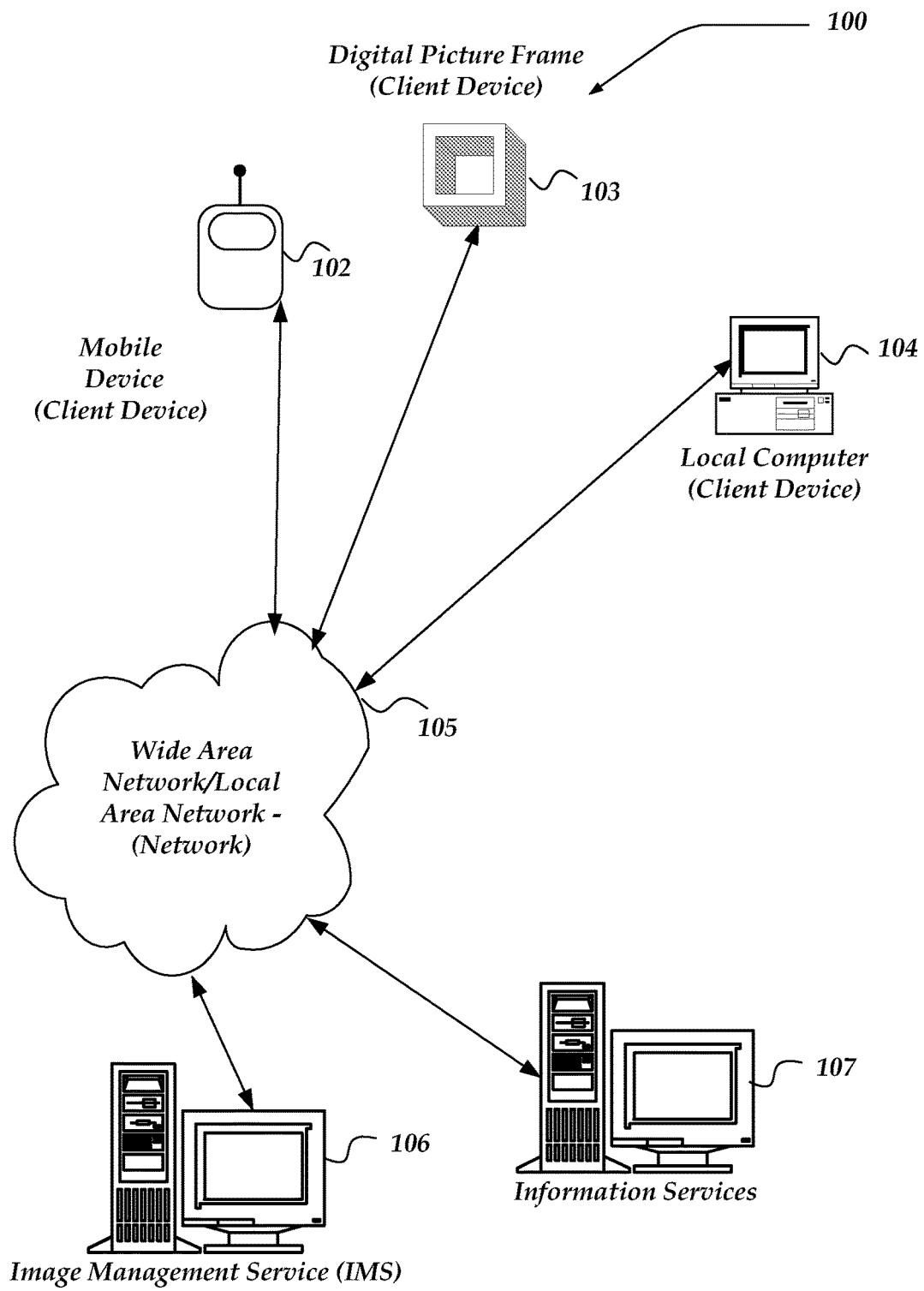
FIG. 1 shows one embodiment of a networked computing environment in which some embodiments may be practiced.

FIG. 1 shows components of one embodiment of a networked computing environment in which some embodiments may be practiced. Not all the illustrated components are required, and variations in the arrangement and type of the components may be made without departing from the spirit or scope of the invention. As shown, system 100 of FIG. 1 includes local area networks ("LANs")/wide area networks ("WANs")—Image Management Service (IMS) 106, and client devices.

One embodiment of client devices 102-104 is described in more detail below in conjunction with FIG. 3. Generally, however, client devices 102-104 may include any device capable of receiving and sending data over a network, such as network 105 or the like. In addition, client devices may include devices 102-104 on which software may be loaded or installed and executed. Thus, client devices 102-104 may include any computing device capable of connecting to another computing device and receiving information. Such devices include portable devices such as digital photograph frames incorporating computer displays, cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. Client devices 102-104 typically range widely in terms of capabilities and features. For example, a cell phone may have a numeric keypad and a limited LCD display. In another example, a web-enabled client device may have a touch sensitive screen, a stylus, and color LCD display in which graphics may be displayed. In another example a client device may include devices that typically connect to a network using a wired or wireless communications medium such as personal computers, multiprocessor systems, microprocessor-based or programmable consumer electronics, network PCs, web-based television devices or the like. In another embodiment, a client device may include devices that are capable of storing and executing software such as personal computers, multiprocessor systems, microprocessor-based or programmable consumer electronics, network PCs or the like. In another embodiment, a client device may be a digital photograph frame with software for implementing the systems and methods described herein, the software optionally preloaded thereon, provided on an accompanying computer readable medium, or made available for download over a network.

A web-enabled client device may include a browser application that is configured to receive and to send web pages, web-based messages, and the like. The browser application may be configured to receive and display graphics, text, multimedia, and the like, employing virtually any web based language, including but not limited to a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), as well as other and future languages and the like.

Client devices 102-104 may also include at least one other client application that is configured to receive content from another computing device. The client application may include a capability to provide and receive textual content, multimedia information, and the like. The client application may further provide information that identifies itself, including a type, capability, name, and the like.

In one embodiment, client devices 102-104 may be configured to enable a communication between users over network 105. Client devices 101-104 may be configured to receive, obtain, look-up or otherwise retrieve multimedia/image information from, for example, a file system, a data store, IMS 106, or the like. Devices 102-104 may be further configured to annotate the multimedia information, and/or share the multimedia information simultaneous with sending a communication between the users, or the like. Client devices 102-104 may perform at least some of the operations of process 400 of the exemplary embodiment illustrated in FIG. 4.

Network 105 is configured to couple IMS 106 and its components with other computing devices, including, client devices 102-104. Network 105 is enabled to employ any form of computer readable media for communicating information from one electronic device to another. Also, network 105 can include the Internet in addition to local area networks (LANs), wide area networks (WANs), system area networks (SANs) connected by Infiniband, direct connections, such as through a universal serial bus (USB) port, other forms of computer-readable media, processor to processor connections, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art or developed through technological advances. Furthermore, remote computers and other related electronic devices could be remotely connected to either LANs or WANs via a modem and temporary telephone link. In essence, network 105 includes any communication method by which information may travel between IMS 106, client devices 102-104 and any other computer devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of IMS 106 is described in more detail below in conjunction with FIG. 4. Briefly, however, IMS 106 may include any computing device capable of connecting to network 105 to enable receiving a selection of a plurality of images over network 105, e.g., using HTTP, receiving images, sending of image information, executing software code and logical processes or the like. IMS 106 may also receive images and other multimedia information from a variety of other sources. IMS 106 may store at least some of the received information for use by a user of client devices 102-104. IMS 106 may perform at least some of the operations of process 400 of the exemplary embodiment illustrated in FIG. 4.

Devices that may operate as IMS 106 include desktop personal computers (PCs), multiprocessor systems, microprocessor-based or programmable consumer electronics, network PCs, servers, and the like.

Although FIG. 1 illustrates IMS 106 as a single computing device, the embodiments of the invention are not so limited. For example, it is contemplated within the scope of embodiments of the present invention that one or more functions of IMS 106 may be distributed across one or more distinct computing devices without departing from the scope or spirit of the embodiments of present invention.

Illustrative Client Device Environment

Figure 2:
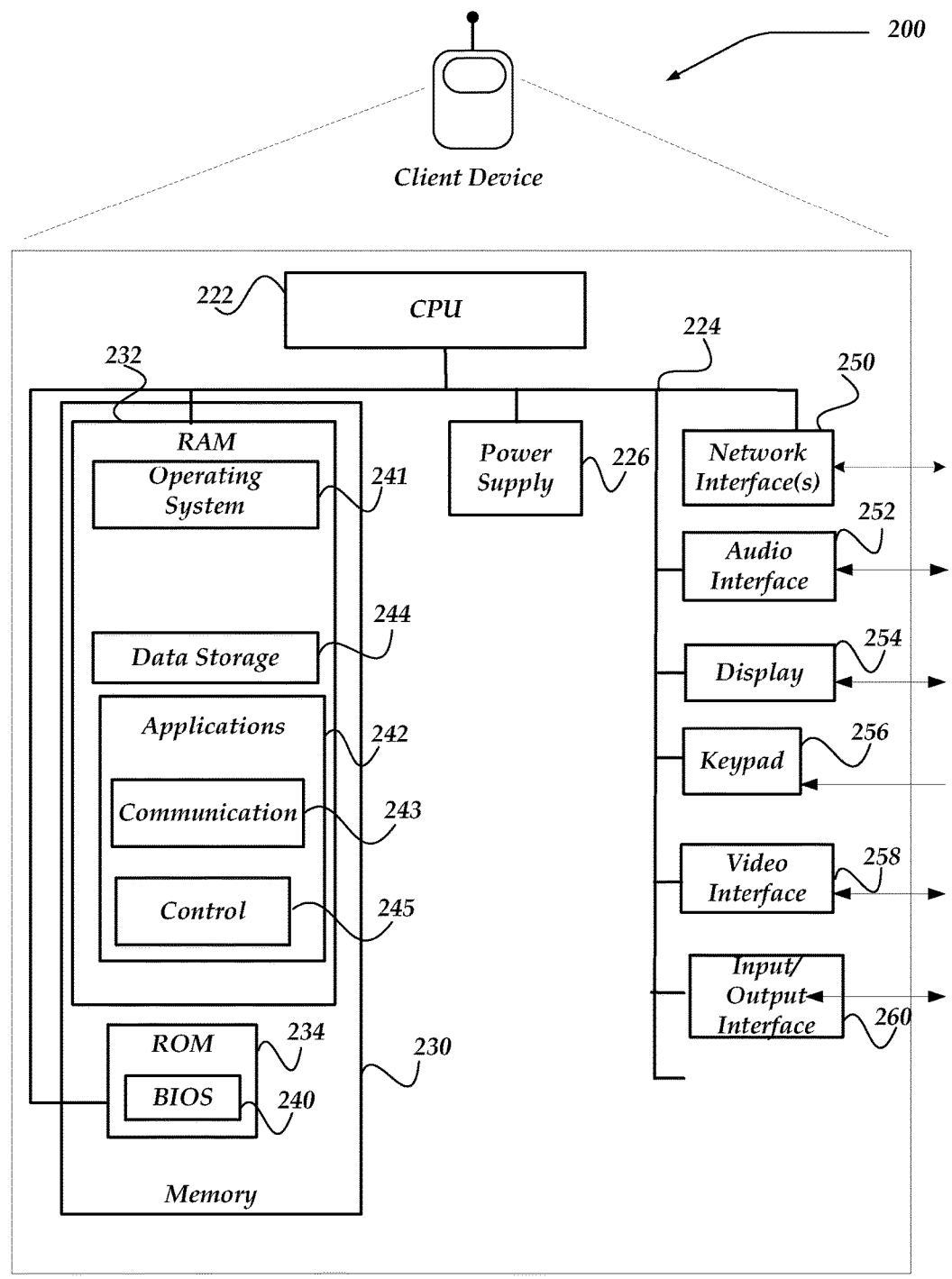
FIG. 2 shows one embodiment of a client device that may be included in the image transformation systems and methods.

FIG. 2 shows one embodiment of a client device 200 that may be included in a system implementing an embodiment of the invention. The client device 200 may include more or less components than those shown in FIG. 2. However, the components shown are sufficient to disclose an illustrative embodiment. The client device 200 may represent, for example, client devices 102-104 of FIG. 1.

As shown in FIG. 2, client device 200 includes a processing unit (CPU) 222 in communication with a mass memory 230 via a bus 224. Client device 200 also includes a power supply 226, one or more network interfaces 250, an audio interface 252, video interface 258, a display 254, a keypad 256, and an input/output interface 260. Power supply 226 provides power to client device 200. A rechargeable or non-rechargeable battery may be used to provide power. The power may also be provided by an external power source, such as an AC adapter or a powered docking cradle that supplements and/or recharges a battery.

Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), the IEEE 802.11 set of standards for carrying out wireless local area network (WLAN) computer communication and the IEEE 802.16 standard for Worldwide Interoperability for Microwave Access (WiMax), SIP/RTP, or any of a variety of other wireless communication or wired communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 258 is arranged to capture video images, such as a still photo, a video segment, an infrared video, or the like. For example, video interface 258 may be coupled to a digital video camera, a web-camera, or the like. Video interface 258 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. Although described as a keypad, a keypad is not essential to embodiments of the present invention and it is contemplated that simple menu driven push buttons, track wheels or other selection devices may be included. Furthermore, a graphic user interface (GUI) may be included wherein such interface provides for selecting through a keyboard, mouse, push button, touch screen or any other selection mechanism known or contemplated. Voice controlled inputs are also contemplated. Keypad 256 may also include command buttons that are associated with selecting and sending images.

The client device 200 also comprises input/output interface 260 for communicating with external devices, such as auxiliary displays or other input or output devices not shown in FIG. 2. Input/output interface 260 can utilize one or more communication technologies, such as USB, infrared, Bluetooth™, Infiniband™ or the like.

Mass memory 230 includes a RAM 232, a ROM 234, and other storage means. Mass memory 230 illustrates another example of computer storage media for storage of information such as computer readable instructions, data structures, program modules or other data. Mass memory 230 also stores a basic input/output system ("BIOS") 240 for controlling low-level operation of some client devices 200. The mass memory also stores an operating system 241 for controlling the operation of the client device 200. It will be appreciated that this component may include a general purpose operating system such as a version of UNIX, LINUX™, or Windows™ or a specialized client communication operating system such as Windows Mobile™, or the Symbian® operating system or any other operating system that works with the client device 200 or is developed to work with a client device. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of the client device 200. The information may then be provided to another device based on any of a variety of events, including being sent as part of a header during a communication, sent upon request, or the like. Moreover, data storage 244 may also be employed to store multimedia information or the like. At least a portion of the multimedia information may also be stored on a disk drive or other storage medium (not shown) within the client device 200.

Applications 242 may include computer executable instructions which, when executed by the client device 200, transform, transmit, receive, and/or otherwise process multimedia information, software, data or the like. Applications 242 may further include control 245, and communication application 243.

Communication application 243 includes any component for managing communication over network interface 250. Communication application 243 may be configured to transmit, receive, and/or otherwise process messages, store such messages, translate between one type of message and another, or the like. Communication application 243 may provide a user interface, such as a conversation screen, video display, or the like.

The control 245 includes any component configured to managing receiving, arranging, and/or selecting images, frame patterns, types, or the like. The control 245 may be embedded in a (web) browser as a control, applet, or the like. The control 245 may use XML, JASON, AJAX, or the like, to communicate with a server over network interface(s) 250. Operations of the control 245 may be performed by process 400 of FIG. 4.

Illustrative Network Device

Figure 3:
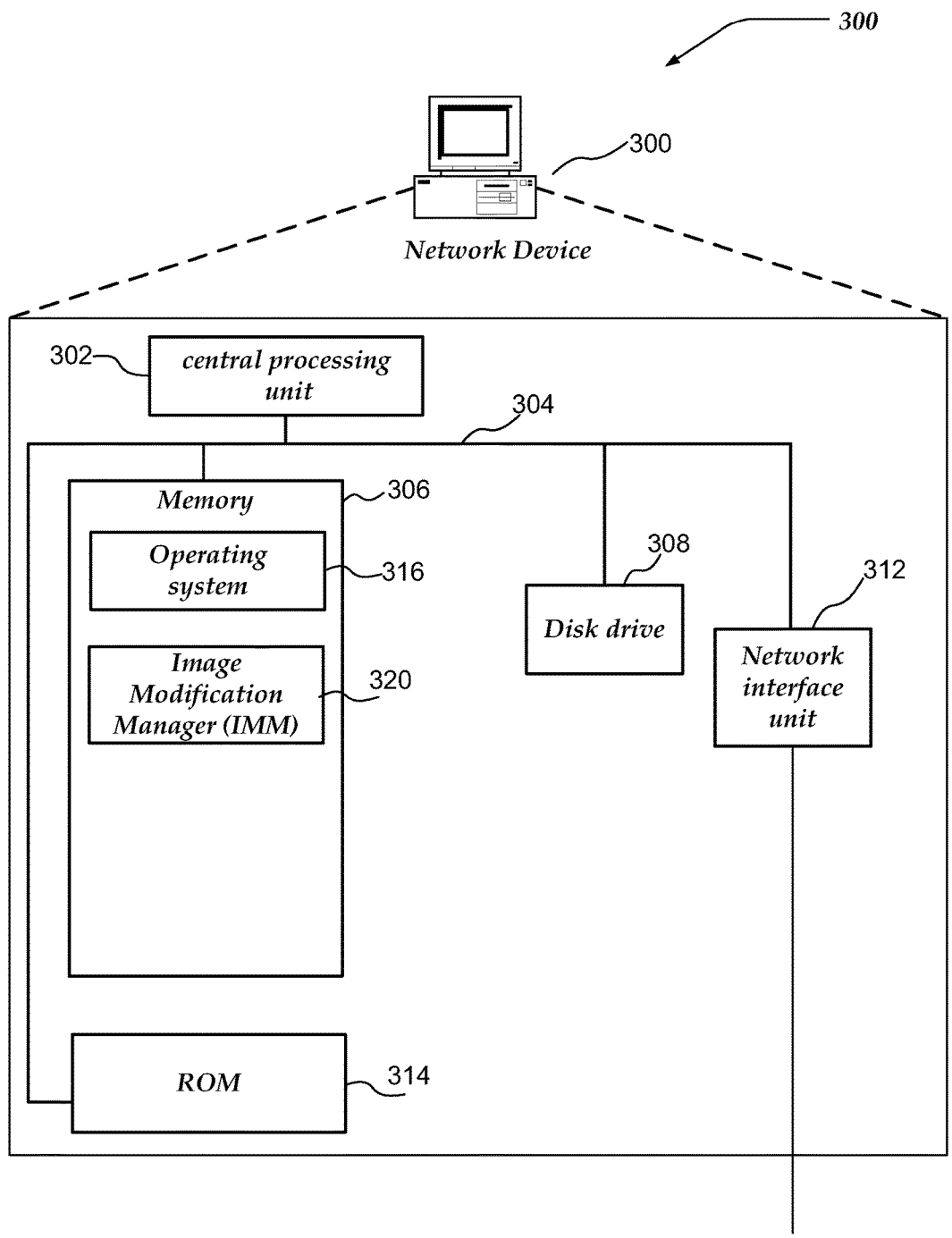
FIG. 3 shows one embodiment of a network device that may be included in the image transformation systems and methods.

FIG. 3 shows an exemplary network device 300 that may operate as IMS 106 of the exemplary embodiment illustrated in FIG. 1. It will be appreciated that not all components of network device 300 are illustrated, and that network device 300 may include more or less components than those shown in FIG. 3.

As illustrated in FIG. 3, network device 300 includes a central processing unit (CPU) 302, mass memory, and a network interface unit 312 connected via a bus 304. Network interface unit 312 includes the necessary circuitry for connecting network device 300 to various networks, including network 105 of FIG. 1, and is constructed for use with various communication protocols including the TCP/IP and UDP/IP protocols. Network interface unit 312 may include or interface with circuitry and components for transmitting messages and data over a wired and/or wireless communications medium. Network interface unit 312 is sometimes referred to as a transceiver, Network Interface Card (NIC), or the like.

Computer storage media may include volatile and non-volatile, removable and non-removable media implemented in any method or technology for storage of information, such as computer readable instructions, data structures, program modules or other data. Examples of computer storage media include RAM 306, ROM 314, EEPROM, flash memory and/or any other memory architecture, CD-ROM, digital versatile disks (DVD) and/or any other optical storage, magnetic cassettes, magnetic tape, magnetic disk storage and/or any other magnetic storage devices, and/or any other medium that can store information that can be accessed by a computing device.

Network device 300 may also include an input/output interface (not shown) for communicating with external devices or users.

Network device 300 can also be implemented as one or more "blades" where the term "blade" refers to one of multiple electronic circuit boards or cards that are installed in a hardware chassis with a backplane. An exemplary blade may include one or more processors, volatile and non-volatile memory, interfaces suitable for communicating information to and from the blade, and other components for enabling the operation of one or more applications. A blade may also include a specialized interface for the backplane and other interfaces, such as a USB port, FIREWIRE port, serial port, RF interface, IR interface, Ethernet interface, IDE controller, Infiniband™ interface, and the like. An application running on a blade may employ any of these interfaces to communicate information to other applications running locally on the blade, or other blades and/or devices coupled to the blade server. Network device 300 can also be implemented as a combination of blades and additional components in the chassis.

The mass memory generally includes random access memory ("RAM") 306, read-only memory ("ROM") 314, and one or more permanent mass storage devices, such as hard disk drive 308. In some embodiments the mass memory stores operating system 316 for controlling the operation of network device 300. The operating system 316 may comprise an operating system such as UNIX, LINUX™, Windows™, or any proprietary system or any other operating system or the like. In one embodiment, the mass memory may store program code and data for implementing Image Modification Manager (IMM) 320.

IMM 320 includes any component configured to manage modification of images over HTTP. IMM 320 may store the image in a data store such as disk drive 308, may create a lower resolution image, or the like. IMM 320 may communicate with an HTTP server (e.g., providing by operating system 316) to provide the lower resolution image to a web control over network interface 312. IMM 320 may receive selections of, among other things, measurements of the plurality of images, frame type, frame pattern, matte type, pattern, color, or the like.

Illustrative Operation

Currently preferred embodiments make use of novel displacement mapping techniques in a variety of ways to perform three dimensional image transformation. Further, currently preferred embodiments provide users with novel systems, methods and apparatuses to transform a user's own photographic images from two dimensional static images to three dimensional animated images. The embodiments are not limited to providing image transformation for humans in photographs, but are equally applicable to animating anything that may have movement, including but not limited to animals, landscape features, vehicles, tools, appliances, equipment and any other object of interest.

Generally, displacement mapping is an alternative computer graphics technique in contrast to bump mapping, normal mapping, and parallax mapping, using a (procedural-) texture- or height-map to cause an effect where the actual geometric position of points over the textured surface are displaced, often along the local surface normal, according to the value the texture function evaluates to at each point on the surface. It gives surfaces a great sense of depth and detail, permitting in particular self-occlusion, self-shadowing and silhouettes. Currently preferred embodiments not only transform a two dimensional image into a three dimensional appearance but also create a dynamic or animated illustrated image. Displacement maps are used in a number of novel ways in conjunction with, among other software, facial feature recognition software to recognize the areas of the face, body and/or other features and allow the users to then customize those areas that are recognized. The facial feature recognition software may be originated by FaceCake Marketing Technologies, Inc., or by third parties for use in embodiments of the present invention. Furthermore, the created displacement maps are used to generate all of the dynamic effects of an image in motion.

Figure 4A:
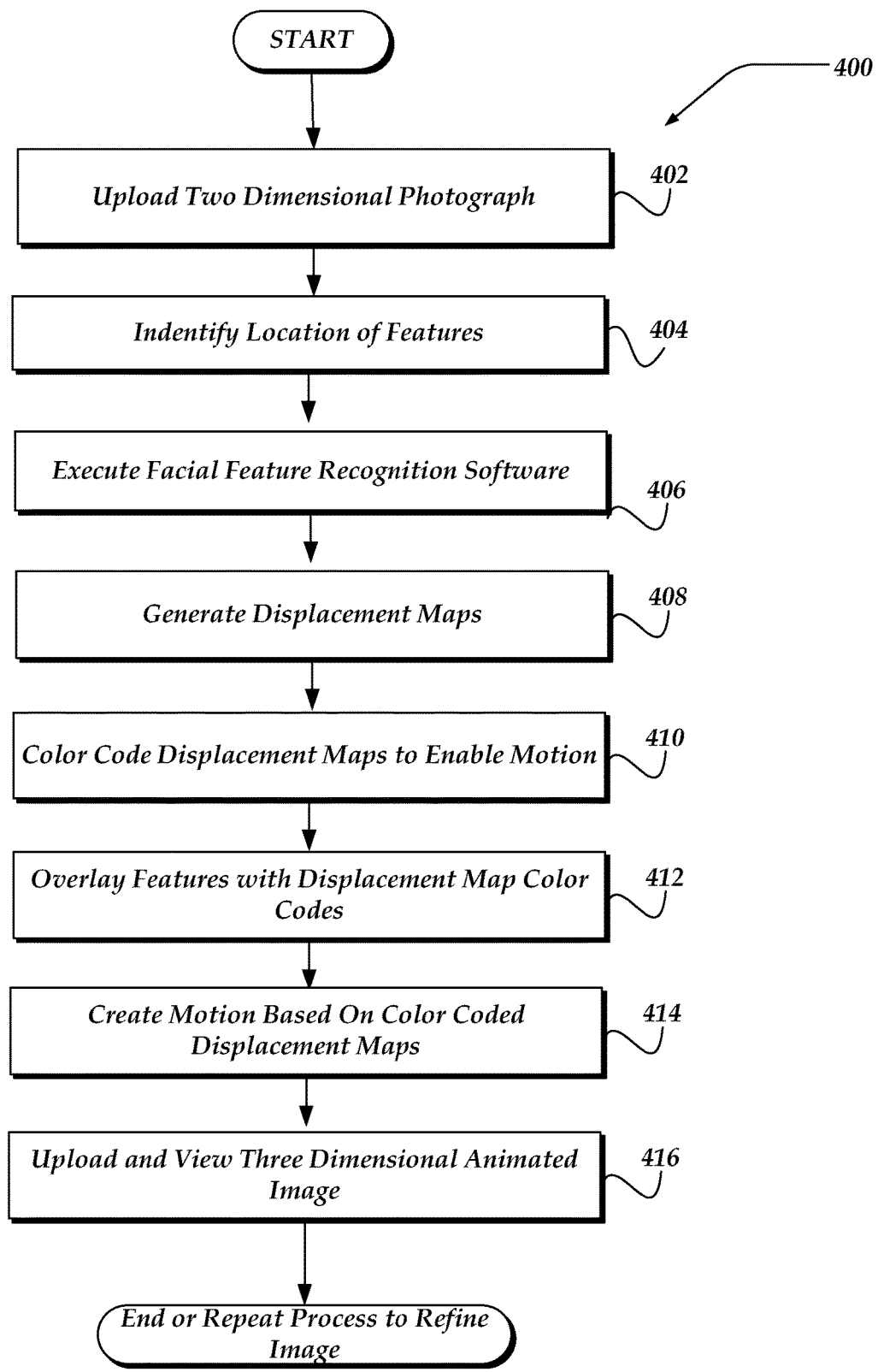
FIG. 4A is a logical flow diagram illustrative of one embodiment of a process for transforming a two dimensional image into a three dimensional image with animation.

FIG. 4A shows a logical flow diagram for creating a three dimensional animated image from a two dimensional static image. Although animation is often characterized in conjunction with non-real life images, i.e., cartoons, as used herein animation or animated refers to an image or object in motion. Further, although described herein as images, this embodiment is not intended to be limitation on the scope, as described herein any multimedia information is contemplated. Further, although the displacement maps in this embodiment are described as color coded, such is not intended to be a limitation on the displacement maps and other variations are contemplated herein. Process 400 of FIG. 4A may be performed, for example, by server 106 of FIG. 1, or the CPU of a local device.

Figure 4B:
FIGS. 4B-4L illustrate exemplary steps of the process of FIG. 4A.
Figure 4C:
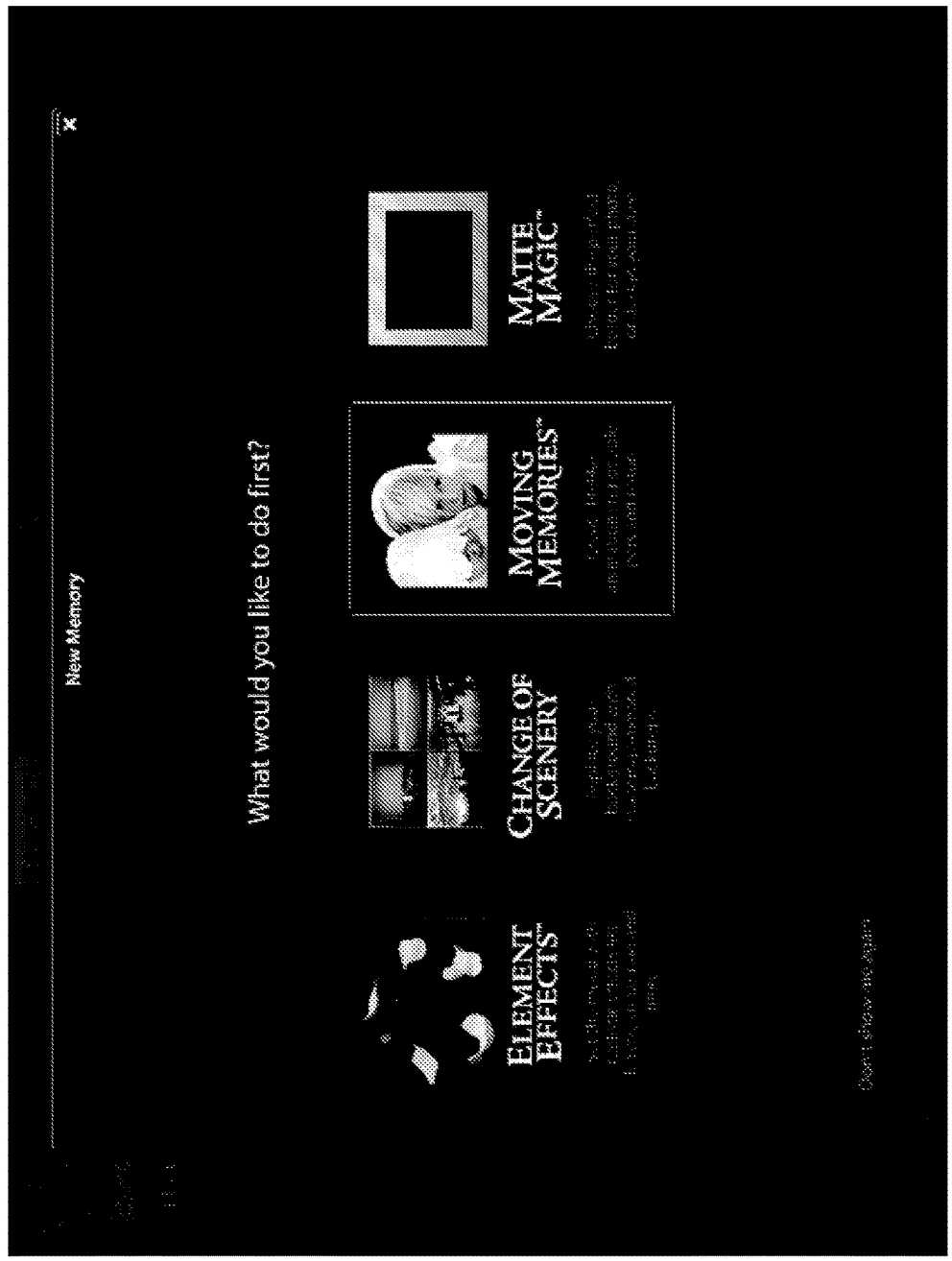
Figure 4D:
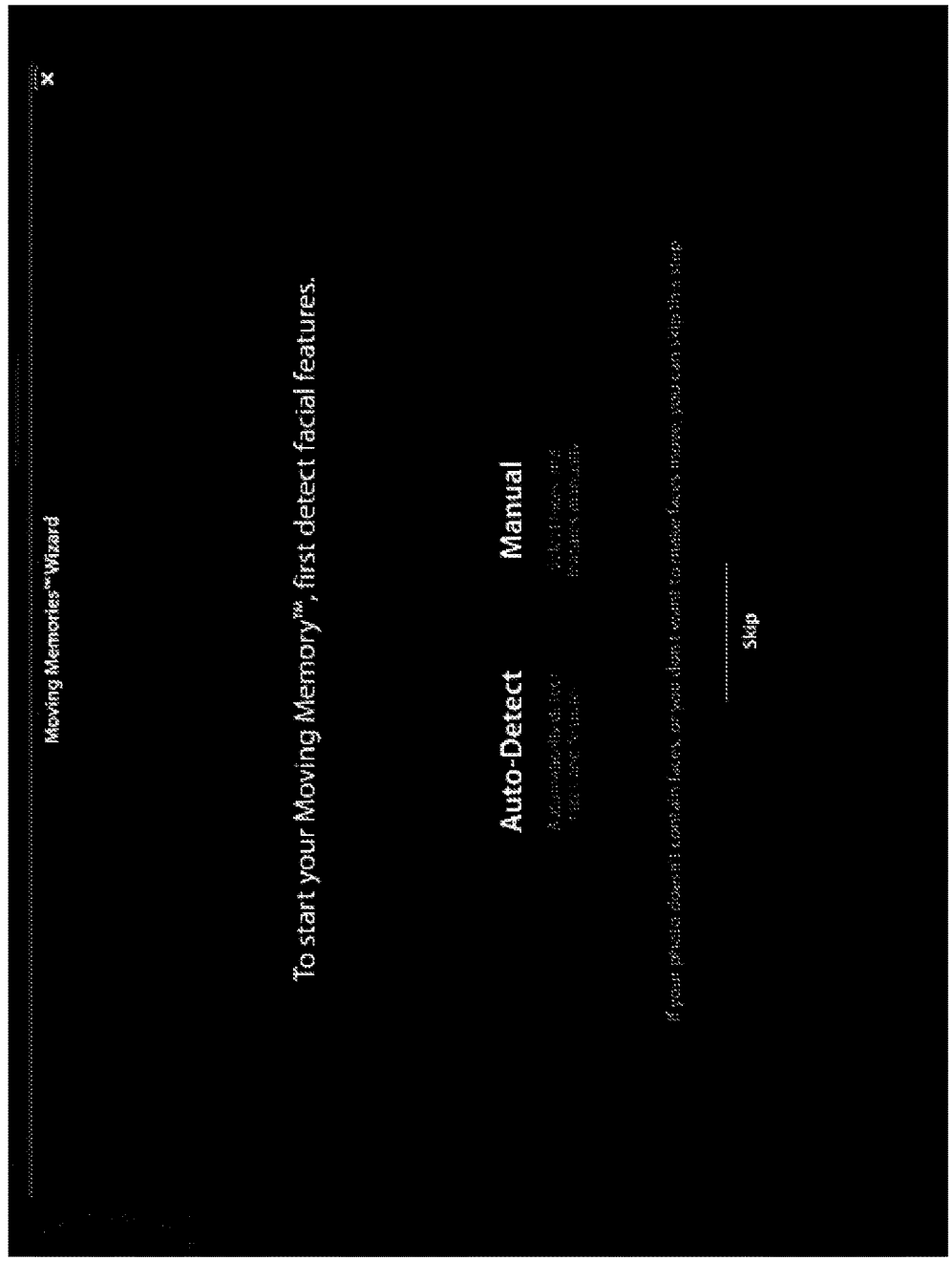
Figure 4E:
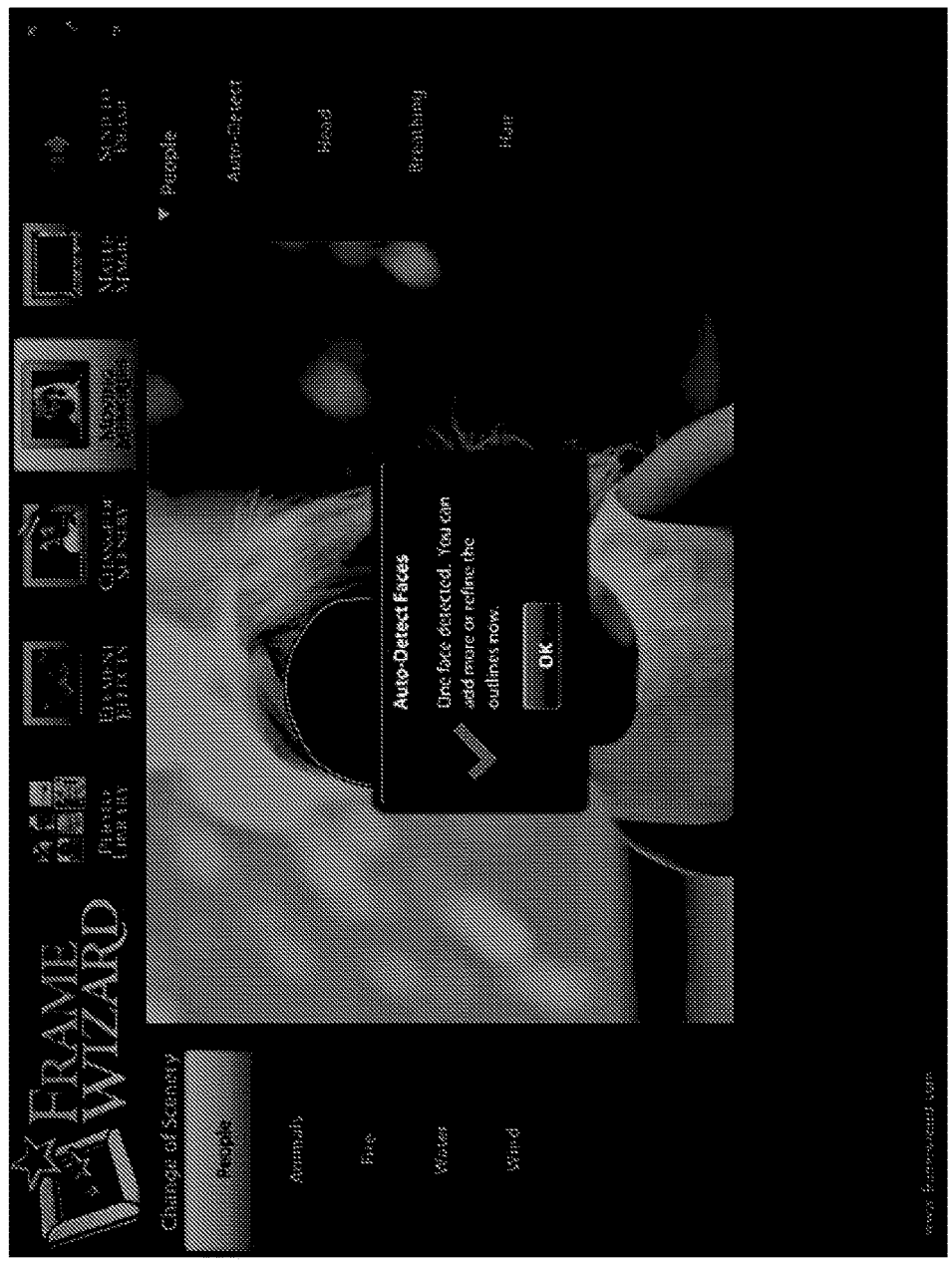
Figure 4F:
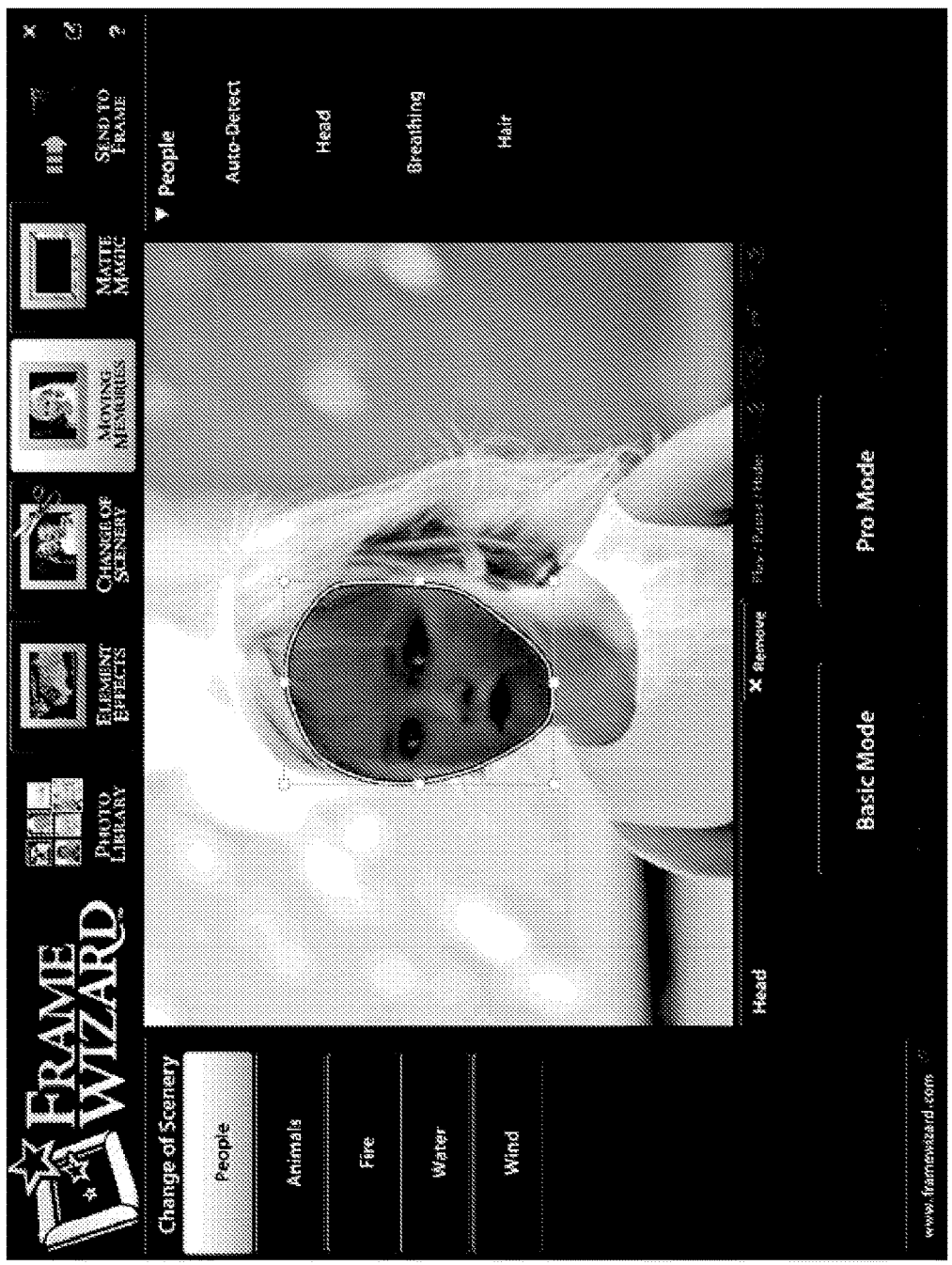
Figure 4G:
Figure 4H:
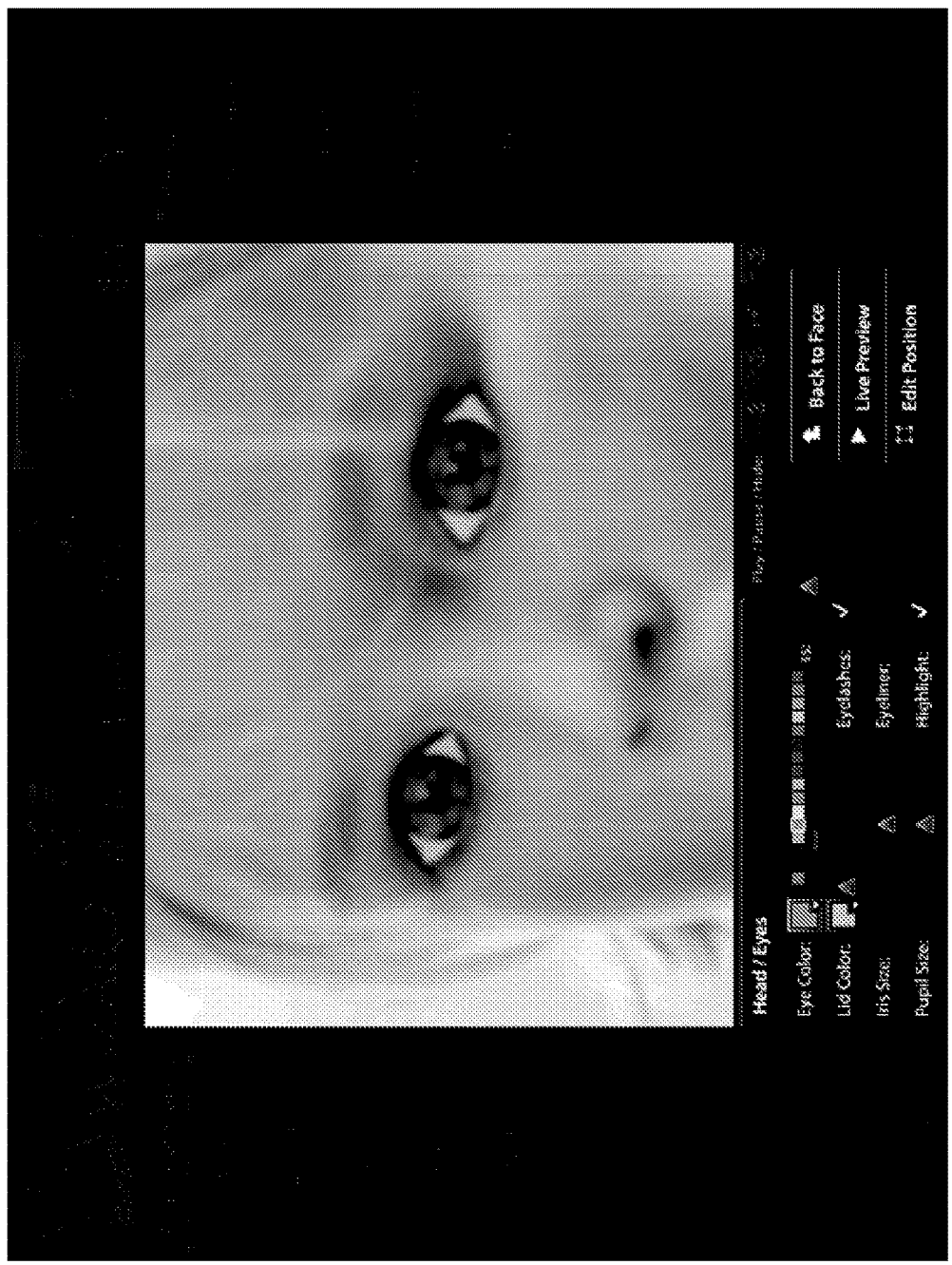
Figure 4I:
Figure 4J:
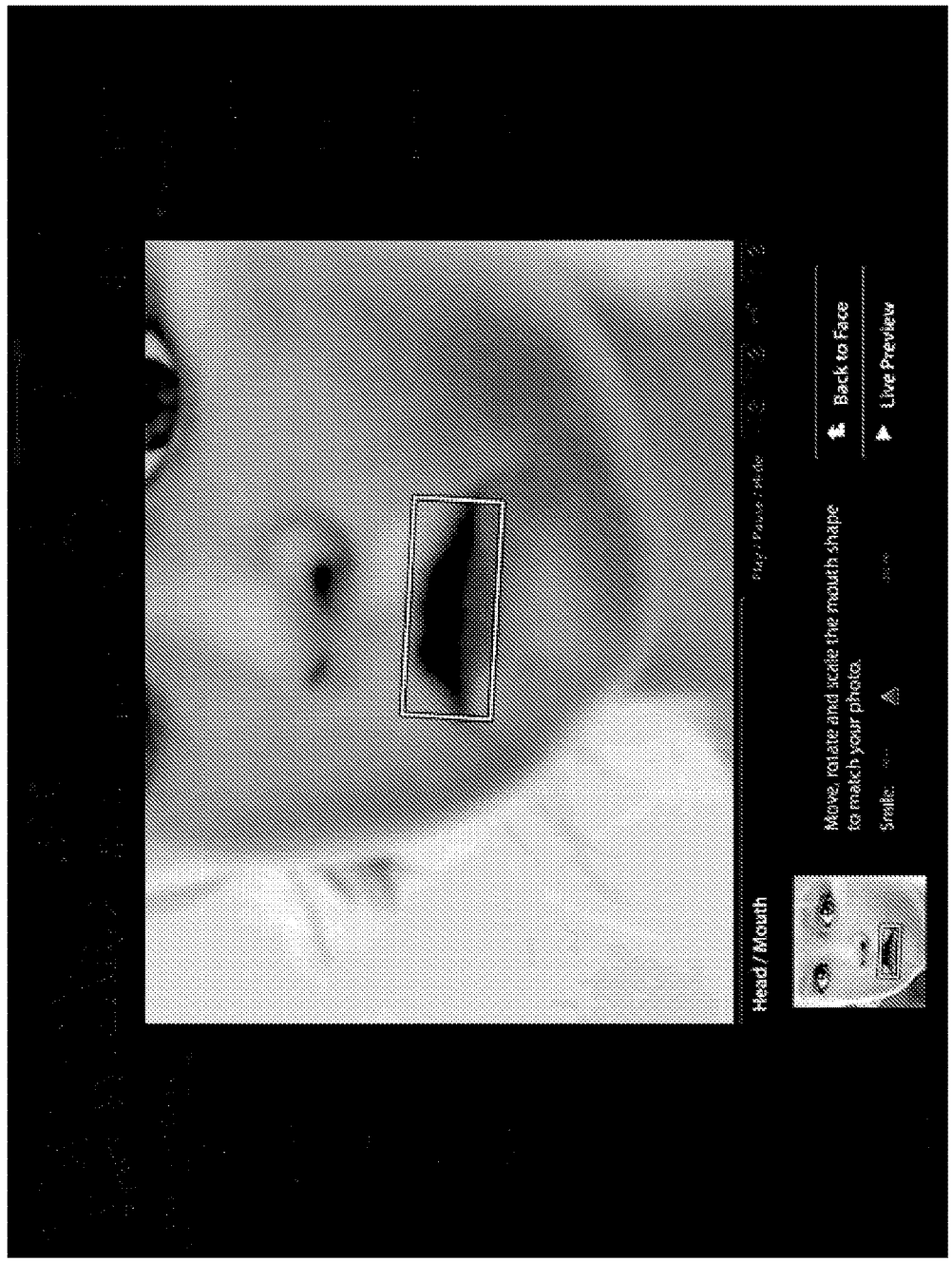
Figure 4K:
Figure 4L:

Process 400 begins, after a start block, at block 402, In one embodiment, the method 400 begins by having a user upload or otherwise retrieve a photograph 402. Such a photograph is depicted in FIG. 4B. As shown in FIG. 4C, a user may be given several different options of what the user would like to do with the image, i.e., create elements, create scenery, animate the image, or create a matter or border. These are discussed in detail below. Preferably the photograph is taken such that the humans and animals are looking straight forward. While preferable such layout is not a limitation on the embodiments of the present invention and using the novel methods described herein, images that are sideways or otherwise not facing forward can be manipulated and physical features can be filled in or inserted by the methods disclosed herein such that realistic three dimensional images are created. If the user selects to animate the facial image, the user is then presented with options through which to create the animation, FIG. 4D. After the image is loaded 402 the user then identifies and defines the location of various features 404 on the image, i.e., eyes, mouth, nose, hair, appendages, i.e., arms, legs, and accessories. Alternatively, the features may be automatically located using facial feature recognition or other object recognition software or can be detected by the software and adjusted or refined by the user. Once the facial features are located 402, facial feature recognition software 406 or other means is used to detect the shape of features, for example the shape of the eyes, the shape of the lips, and shape of the nose. FIGS. 4E-4G, depict such processes. Having identified the location of the each of the potentially moving part, the moving part is then be detected. The moving part may also be modified in shape, color or any other visual aspect as shown in FIGS. 4G-I. In some embodiments, it may also be desirable to identify the location of clothing or other appurtenances as shown in FIG. 4K. From this detection, displacement maps are generated 408. One embodiment of a method for displacement map creation is discussed below in connection with FIG. 5A. The created displacement maps allow the user to interact with the various features and allow the user to create realistic motion. Such movement is shown in for example FIG. 4L, wherein the eyes, eye brows, mouth and dress detected previously are modified and moved.

In one embodiment, the displacement maps are color coded and each color is correlated to a specified motion, i.e., up, down, left, right 410. Then each feature has one or more displacement map colors overlaid on it in order to control the motion of the feature 412. For example, a circle is placed around a head in an image. The circle is given a color, in this instance for example, purple. If purple is designated as being tied to a down motion, then the circle demonstrates the head points down. Similarly, if a green color is applied to the same shape, and green is associated with an up motion, then it makes it point up. The image is in motion when the color changes whether in intensity or the actual color itself. For example, if the user moves the mouth up and down it changes the color of the circle which manipulates the user's image on the screen. Combining multiple colors enables the image to appear to have realistic movement. Other embodiments for displacements maps include but are not limited to vectors, numerical representations, and symbols.

The part to be in motion may be created in multiple ways 414. For example, the user can create his own motion to be loaded on the image or into the memory of the device or the user can just select a preset motion which may be random or created from option, or the user can modify an existing preset motion.

In one embodiment, pre-set motions are attributed to attitude, for example, sad will result in an overall solemn appearance, which includes looking down or happy, which results in looking up a little bit smiling, etc.

After the motion is set, the image is loaded and available to view. The three dimensional animated image may be an audio video interleave file. The movements are recorded using software that provides for a screen capture on the fly. The images are then condensed together. When the digital image is viewed, the screen captures the sequential images that are created from the displacement maps. In a preferred embodiment, the screen captures fifteen frames a second. While this capture rate is a preferred rate, it is not intended to be a limitation on the rate of screen capture and a larger or smaller number of frames may be captured.

Currently preferred embodiments provide methods for creating realistic three dimensional impressions of two dimensions real world objects by utilizing custom dynamic displacement maps. In one embodiment, the two dimensional representations are digital photographic images, in another embodiment, the photographic images are scanned into the memory of a device. In one embodiment, the three dimensional impressions are displacement maps with a variety of features that are user controlled or dynamically generated.

Figure 5A:
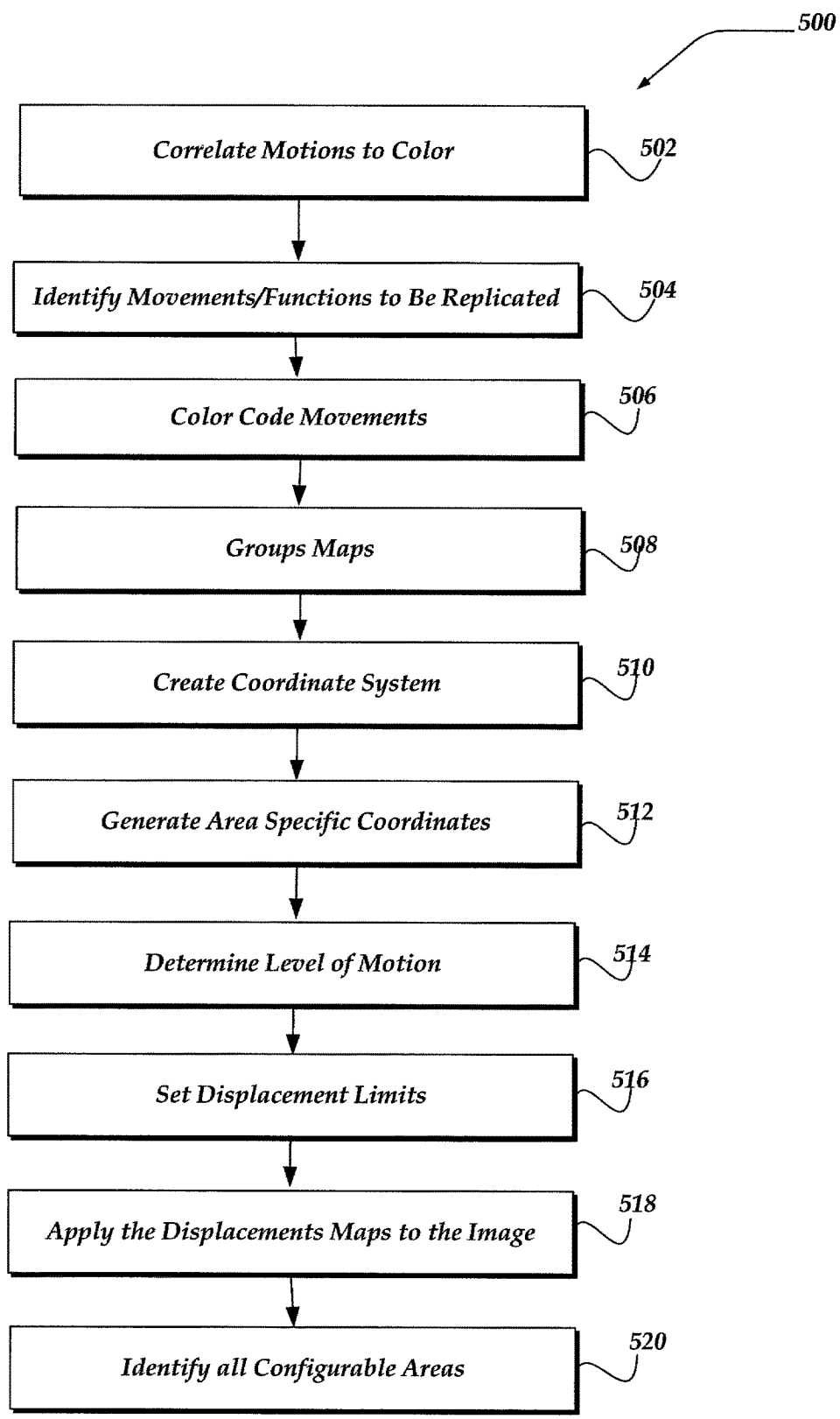
FIG. 5A is a logical flow diagram illustrative of one embodiment of a process for creating displacement maps.

FIG. 5A depicts an embodiment of an exemplary method for creating a novel color-coded displacement map 500 which relates movement and direction of elements of a two dimensional representation. The method begins by correlating motions to colors 502. In one exemplary embodiment, the motions are color-coded as follows: purple—down, green—up, pink—left, teal—right. These color codes are not intended as a limitation on the embodiments, and alternate and additional motions and color codes are possible. In the method the color codes are manipulated to create motion effects. For example, to emulate bouncing green is turned off and on over a period of time, the motion can be smoothed and further manipulated by fading the color codes in and out to create smoother movements. After the motions are correlated to colors, the movements or functions that are desired to be replicated are identified 504. Such movements include but are not limited to side-to-side motion, looking up or down, bouncing, and waving. After the movements and functions are identified, the movements are color coded 506. For example, in a displacement map, purple may be associated a down movement or downward motion. If purple is associated with such motion, then for example, because eyelids are always blinking down, that portion of the two dimensional image appears purple on a displacement map. After the movements are color coded, groups of displacement maps and parameters are used to create emotional states 508. In order to create realistic three dimensional movements, various parts are grouped together. For example, the eyes, mouth, and other parts of the face often behave in related manners when facial expressions create emotions including but not limited to happiness, sadness, disappointment, and anger. Similar methods may be utilized for other coding systems, exemplary methods are described below. Although the displacement maps in this embodiment are described as color coded, such is not intended to be a limitation on the creation of displacement maps and other variations are contemplated herein. Such embodiments may be implemented using the steps as described herein as well.

In another embodiment, vector representations are implemented to code displacement maps. In this embodiment, a vector is projected into the third dimension, off of the image, to represent the displacement. The magnitude of the displacement is measured by the size of the vector and the direction, either X or Y, may also be represented by the vector going into the positive or negative axes.

Figure 5B:
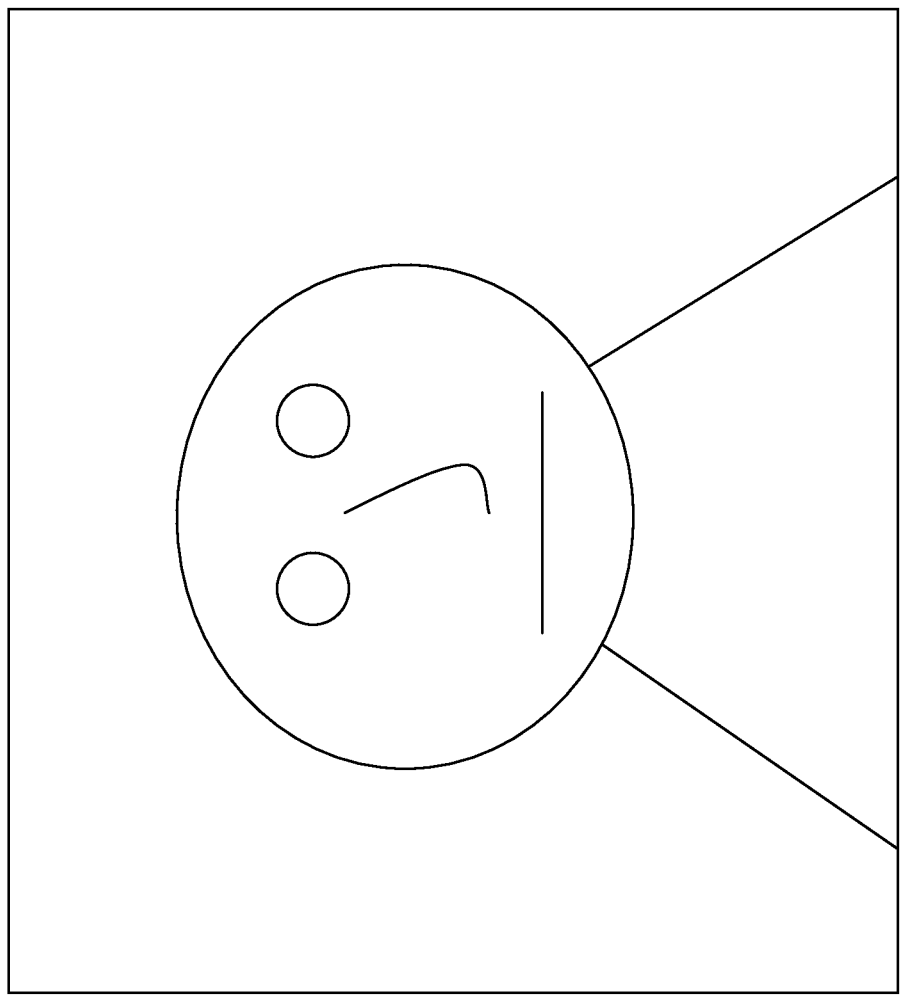
FIGS. 5B and 5C illustrate another embodiment of a process for creating displacement maps.
Figure 5C:
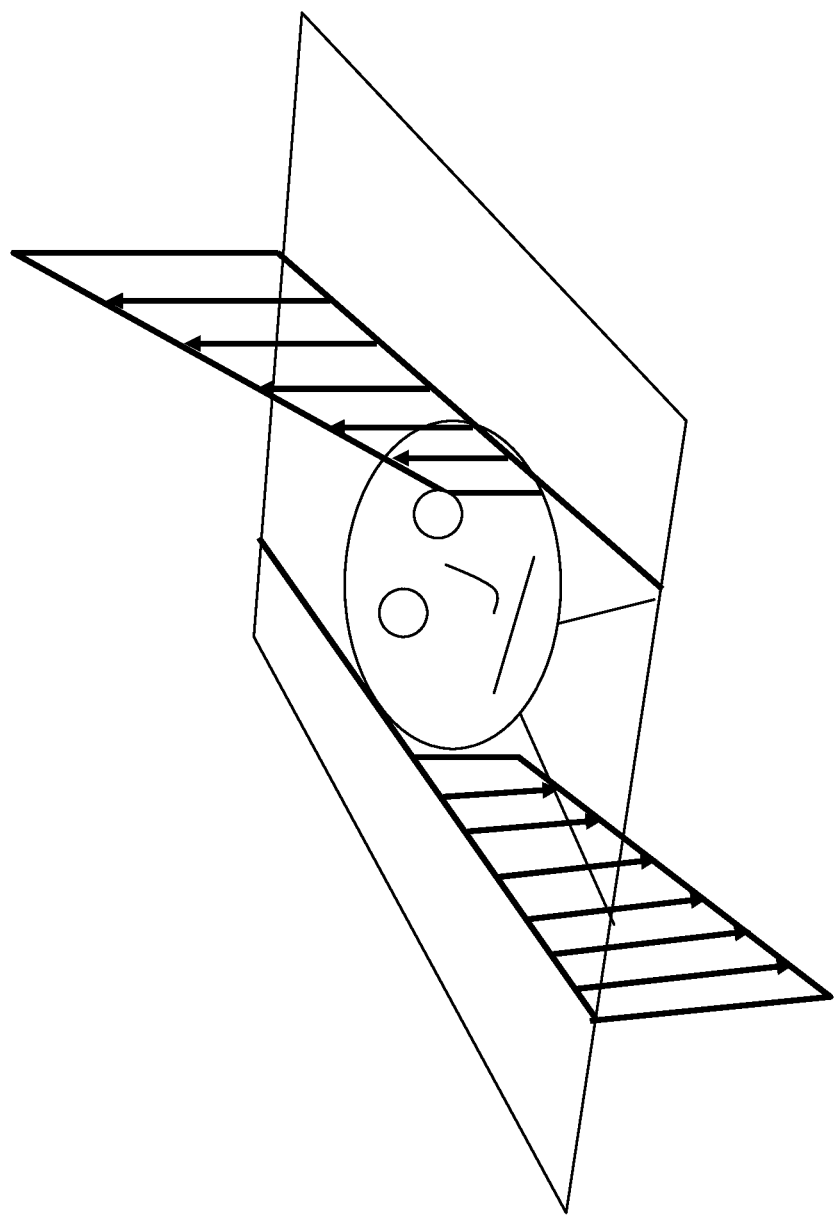

As illustrated in FIG. 5B, the process begins with a two dimensional image. The vector representations may be best shown when the image is rotated out of a flat 2d representation and the vectors are then projected on to the rotated image accordingly as depicted in FIG. 5C.

In still another embodiment, the displacement is developed by implementing different shapes or symbols to represent different types of displacements. The orientation of the shape, as denoted by an arrow, or animated highlight, or other marker, will indicate which direction it will move during the displacement. The various shapes can be for example stretched to indicate the size of the distortion, and different shapes, including but not limited to rectangles or triangles, can be used to depict different styles of displacement.

Figure 5D:
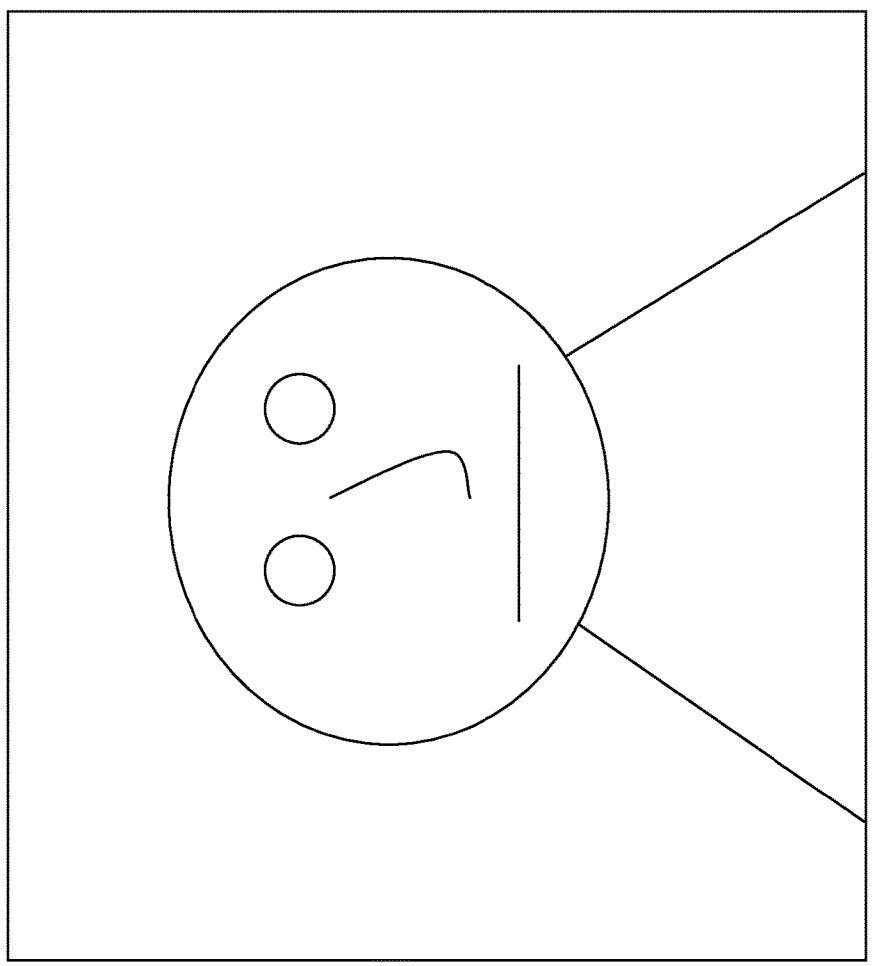
FIGS. 5D and 5E illustrate another embodiment of a process for creating displacement maps.
Figure 5E:
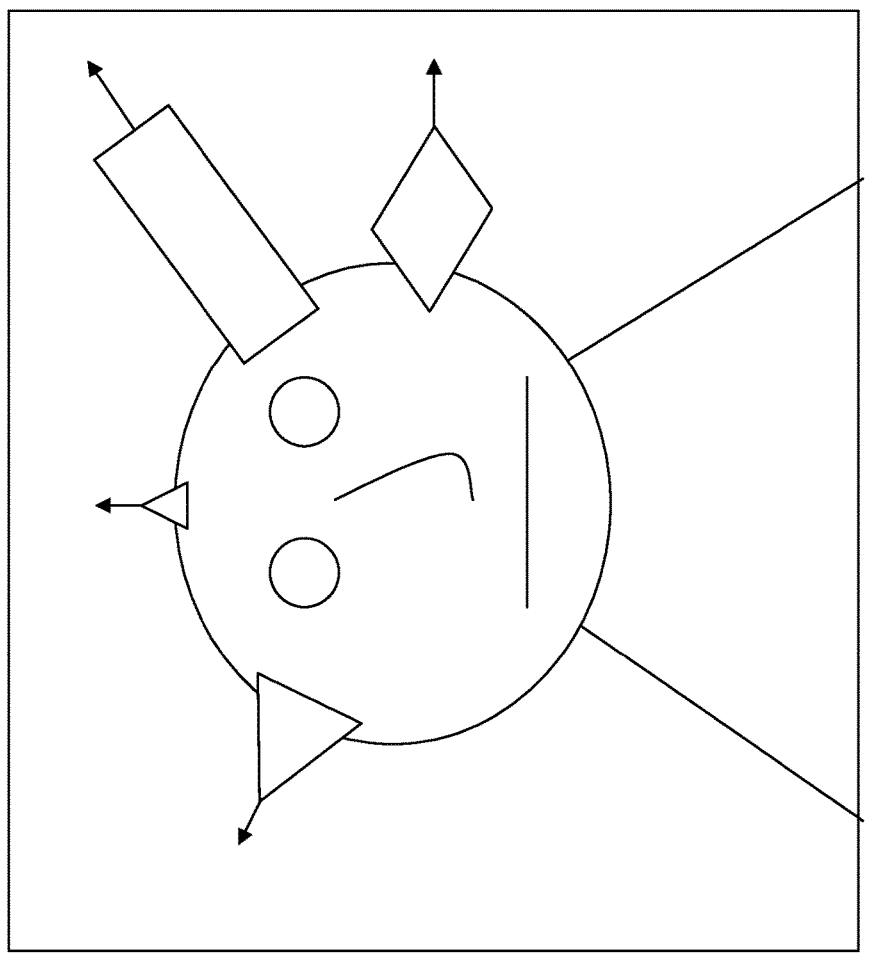

As illustrated in FIG. 5D, the process begins with a two dimensional image. Any N sided shape can be used, and generally elongated in one axis to portray a direction as depicted in FIG. 5E. Although this embodiment is described with respect to N sided shapes, alternative embodiments contemplate the use of shapes such as ellipses.

Figure 5F:
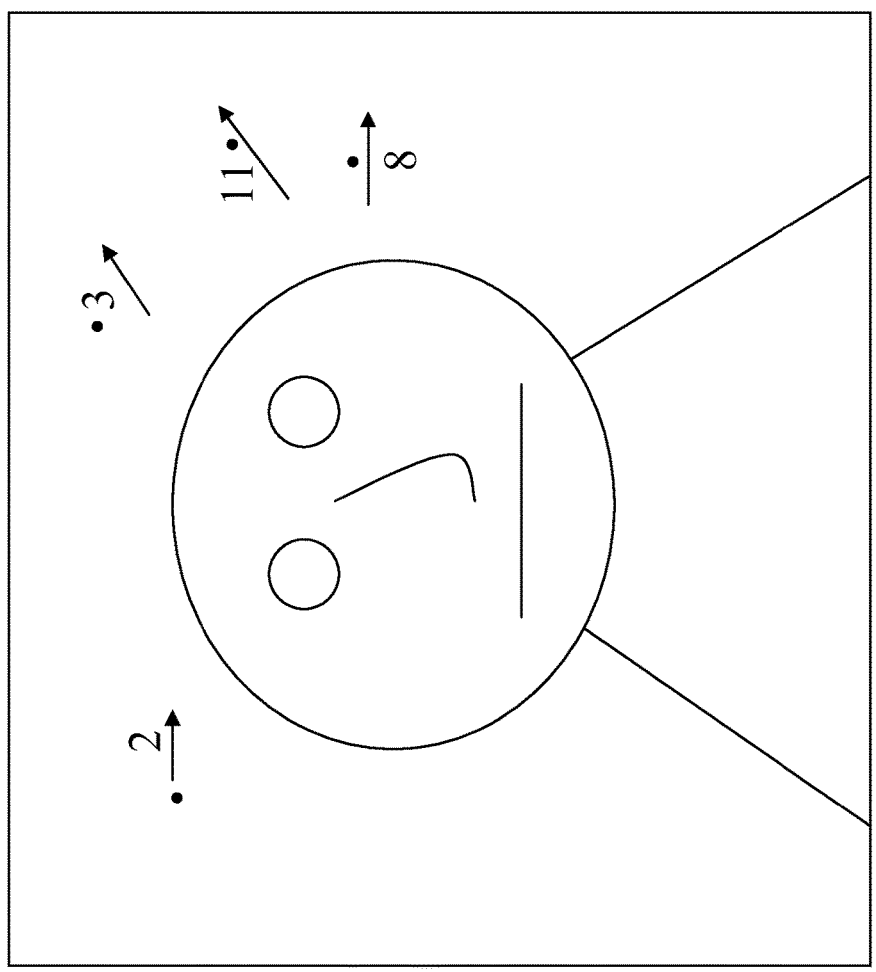
FIG. 5F illustrates another embodiment of a process for creating displacement maps.

In another method the various displacements are represented by numbers which cover specific geometric areas. Rotating a number and adjusting the physical size of that number provides a way to weight the various projections. By adding both rotations to the numbers, as well as sizes, additional information about the style of the displacement may be added including various types of rotations and other projections beyond a straight forward translation as depicted in FIG. 5F.

Figure 6A:
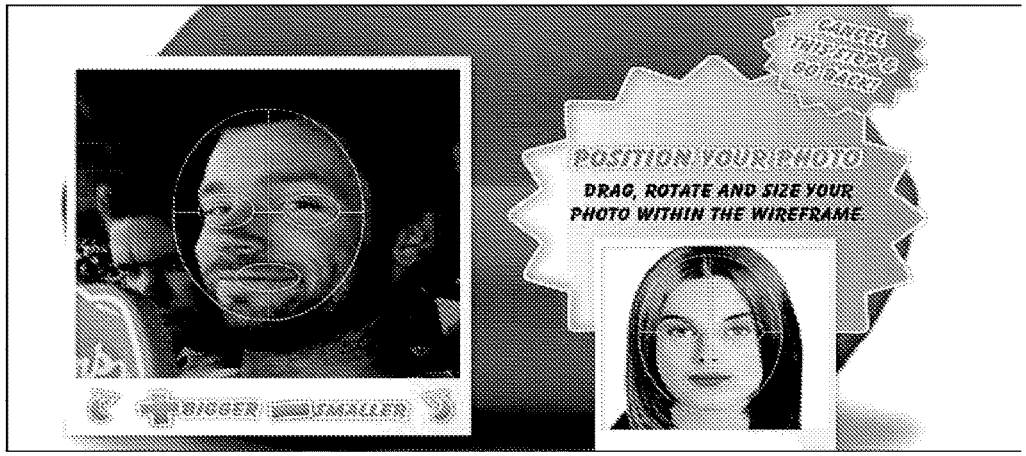
FIG. 6A depicts an embodiment of an image that has undergone facial feature recognition.
Figure 6B:
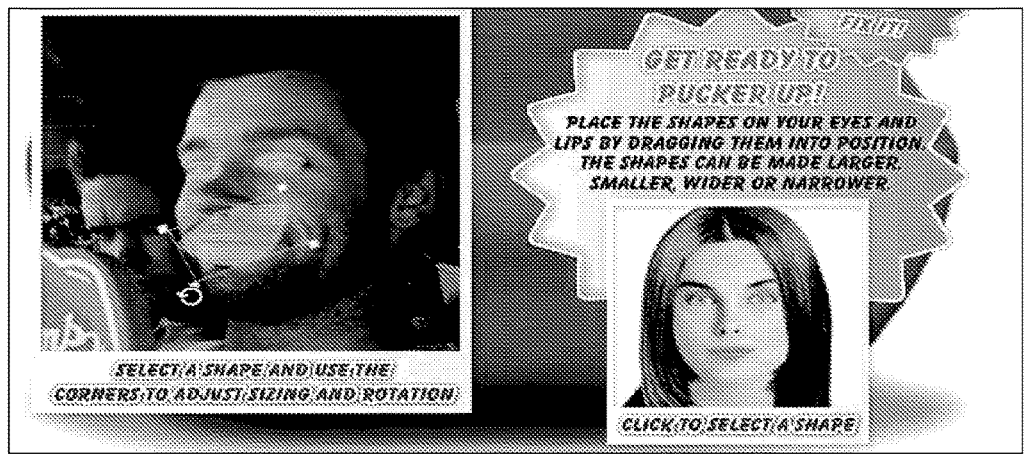
FIG. 6B depicts the image of FIG. 6A after the facial feature recognition has been refined by a user.

After grouping, the primary areas are related to a coordinate system 510. Coordinate systems are developed for all areas or items for which movement is desired. For example, a coordinate system is developed for eyes or lips in the same way a coordinate system may be developed for clouds or leaves. Most, but not all of the points in the coordinate systems represent the outline of a two dimensional shape to which the displacement maps are applied. This is not however a limitation on the coordinate system and it is contemplated within the scope of the embodiments of the present invention that the coordinate systems may also represent control points to indicate the location of certain features or boundaries. A non-limiting example of the development of a coordinate system is described in an embodiment of a face as shown in FIGS. 6A and 6B. As shown in FIG. 6A, a user can either place shapes in desired areas, like circles over eyes or allow a facial feature recognition software program to detect specific areas. Once the areas are identified, such areas may be further refined by resizing or repositioning the shapes in order to obtain the desired fit as shown in FIG. 6B.

The use of facial expressions to represent emotion may have configuration settings for various ethnic groups. The movements of facial features vary among some ethnic groups, and some have more eye movement in the presentation of happiness, and others may have more mouth movement. The configuration of ethnicity will help to facilitate localization in various regions of the world.

After the shapes are placed, or as the shapes are being placed, coordinates for the displacement map for the particular area are generated 512. As a result, the XY coordinates for any shape or area are stored in unique patterns specific to that user image.

Once the coordinate system is developed, the appropriate motion levels are evaluated and determined 514. Each motion may have appropriate levels for general movement that have constraints to ensure that the movements are realistic. Non-limiting examples include but are not limited to: an eyelid, which goes down a specific amount; an eyeball, which moves within the bounds of the eye, a head, which only twist so far relative to the neck. The method 500 may set parameter for these and other maximum displacements 516. Optionally, a user may adjust the maximum so that it is less than the maximum set by the system. In an alternative embodiment, where realistic movement is not a requirement, the user may adjust the displacements beyond the maximum to create special effects (i.e., a head that spins). Each motion level corresponds to specific XY coordinates. In any given scene or context, the XY coordinates may change based on the logic of that context. For example, the waves in a lake will never move as high as the waves in an ocean. As a result, parameters are preset given the context of the motion. In alternative embodiments, the context of the motion can be refined from the preset by the user or optionally set by the user thereby allowing for special effects.

In conjunction with the creation of realistic motion, passive counter motion may also be implemented. Passive counter motion creates more natural movement by adjusting the intensity and direction of the motion. From alpha to 100% the amount of motion applied can either be nothing or intense. This is preset for the setting and object interaction that is selected. In one embodiment, a motion movement is assigned 0% alpha in which case it does not move at all no matter how much the direction is moved. So if a movement X does not precipitate a movement Y then there are instances where the Y motion will not occur at all. Counter motion may also be assigned to different motion directions for realism. For example, there may be a preset boundary on specified motions so that there are not unrealistic movements. Such boundaries are passive in that they do not stop the movement in its entirety but merely limit it. In a simplified example, an upward and downward direction motion sequence could be on a scale of 0 to 10, 5 being no motion at all (or the image in its original position, which optionally may be a neutral position). As a face looks up in an upward motion, say from 5 to 8 on the scale, a boundary that is preset at the top of the head begins to push back at a slight ratio so that although the head can still be raised up further, the head will not start to flip over on itself or backwards. As the direction moves up to 9 on the scale the push back downward ratio increases and at the maximum level of 10 the face is looking up as far as it is can. Although these limits may be preset, in one embodiment, for special effects, a user may override the set limits.

After the coordinate system is developed, the various displacement maps are applied to a single image 518, i.e., facial features are coordinated so that they function together allowing for multiple motions at one time. The coordinates for the defined areas and the coordinates for the motion levels all use values from the same input stream. All sets of coordinates are unique to the individual photograph which is being mapped. The mapping is designed to allow for a user's single image to do multiple movements or actions simultaneously. For example, a baby could bounce on a person's knee, look left and blink while smiling using one data stream. In order to assure realistic movement, certain aspects rely on the established XY coordinate system. For example, eyeball movement is determined by XY coordinates reflecting the correct angle and motion. An eyeball's motion is not determined by a displacement map, only from XY coordinates of the input stream, however the eyes themselves are affected by the displacement map. For example, when a person looks to the left, the eye socket follows the face as it should. The eyeball however, has its own range of motion inside the affected area of the displacement map. In this example, a user can direct the motion of the eyeballs using the mouse to determine where the eyeballs are looking.

In addition to multiple motions at one time, the method 500 provides for the displacements maps to function on multiple configurable areas within one photo 520. When more than one configurable area is present in one photo the user creates displacement maps for each area. Furthermore, the user is not limited to creating displacement maps for people or animals, displacement maps may be created for trees, cars, or any other type of object where motion is desired. In addition, displacement maps may be created for clothing or accessories so that such will move appropriately with the person or animal. Additional control features are also provided in the multiple configurable areas, for example if more than one person is in the photo then the blinking rates can default to alternate motion frequency so that the individuals in the image do not blink in unison. Such default modes can however be adjusted or overridden by the user if desired. As a result of allowing for multiple configurable areas, the photographs are more organic and realistic.

In one embodiment the multiple areas in one photo can dynamically interact with each other—people within an image glancing at each other and then back forward, etc. or one area motion can interact with a second area motion—a person's bouncing knee and a baby bouncing on the knee. Furthermore, multiple areas within one photo can all have unique data parameters and motion movement can be independent or interactive with other motions within the photo.

In one embodiment the displacement maps may be set to react to external stimuli in real-time, such as motion sensors and cameras. This allows photos to "follow" people as if looking at them.

In one embodiment the displacement maps may be set to react to digital stimuli in the real-time, such as lights, balloons or other objects. This allows photos to "follow" visual artifacts within the animated scene. For example, a face could be animated to watch a falling snowflake.

As described in the method herein, embodiments of the present invention provide logic and processes that create realistic three dimensional moving renditions from two dimensional images, preferably photographic images. These processes create dynamic live real-time images by creating live actions such as blinking, winking, yawning and smiling. As a result of these actions, the images appear to move and express emotions which make the photo appear more realistic. For example, using the processes described herein, a breathing motion may be created. Breathing is a key realism component in this format. To assure the image is realistic, the different rates of breathing—more for a child, less for an adult, different for a dog are provided. The rates may be set automatically using defaults, or may be user defined. For example, if the photograph is of a finish line at the end of a race, the user could set a faster breathing rate than the default rate. The novel displacement mapping techniques allow for areas to be selected and mapped in a coordinated manner i.e., the chest, mouth, cheeks to create realistic breathing. Moreover, a single area can be coordinated and mapped for multiple different movements.

Embodiments of the present invention also provide for facial feature matching and creation, for example, creating artificial eyes (or the ability to match user eye color) teeth, eyelids, and other facial elements or physicals features such as hair to render a two dimensional photograph more realistic when animated as described below. The generated features improve the realism of the three dimensional image and also provide for increased interactivity and motion options.

Embodiments of the present invention also provide the means for users to take photos that are damaged or impaired and improve or alter their appearance, opening half closed eyes wide, for example, or modifying unkempt or windblown hair and/or other objects that require modification within the picture to improve or alter its appearance. In addition, embodiments provide for refining features i.e., changing the shape of a feature or modifying colors of features, i.e., changing the color of eyes or hair. More examples include moving someone's gaze to a desired direction or in a happy occasion photograph, the ability to add a smile to a member of the party who is not smiling.

The three dimensional animated image may be further modified and refined to create an even more realistic depiction. In one embodiment, such realism is created by animating the eyes so that they move and blink. This type of motion requires not only a combination of displacement map and the facial feature recognition but also an understanding of the body's physiology. Furthermore, the novel methods herein provide for replacing a feature with another or a modified feature. For example, changing the color of an eye. In an eye there is the iris, the pupil, a highlight. Then a boundary is drawn that is approximately twice the size of the eyeball. The square may be drug around to emulate the motion of the eye. For example, when the image looks to the far left, there appears to be a curve to the right side of the eye as it would curve in real life. In this embodiment, the eyes from the image are replaced with eyes that can be moved with displacement maps. As a result, the replaced eye looks very similar, i.e., shape, size, and color, to the eye in the image. Alternatively, the user can chose to create a different looking eye than the eye in the image.

In addition, embodiments of the present invention provide for an eye blinking movement. To create an image of an eye blinking first, the skin tone of the eye lid must be determined. The eye lid skin tone may be matched to the skin tone of the face. The matching can be done automatically or the user may select the skin tone. If an automated tone is selected and the user determines such tone is not proper, the user can adjust the tone or select a new tone. To emulate blinking, eye lashes must also be added to the image. Eyelashes are added for the top and the bottom. Eyelashes may be applied by selecting such from an existing set and the lashes are then dynamically sized to fit the lid placement, curve and length. The lashes may be different for different demographics—women have longer lashes, men shorter, a small dog's lashes are longer, etc. and the user may customize such. The process may be repeated for each person in the photograph. After the skin tone, eye color and eyelashes are selected, the eye lid is created based on the shape of the eye in the image. Displacement mapping is used to create the eye lid. This novel eye lid creation technique also for user adjustments. The ability of the user to adjust is very important because the lid has to match the eye shape, moreover, the lid cannot blink below where the eye is or the motion is not realistic. By using displacement mapping, the eye blinking motion become realistic because the blink must appear to occur over a rounded surface, i.e., the eyeball and not a flat surface. Using similar techniques, a smile can be created including the teeth even when there is no smile in the image. In order to create such, the face itself must be adjusted not just the lips, i.e., the cheeks are raised.

For the eyeball the same parameters may be used as are used for the eyelid. In addition, gradient maps may be implemented to improve texture and shadow so that the spherical shape of an eyeball is more accurately reproduced.

The iris and pupil may be generated in a variety of ways. For example, facial feature recognition or self selected user placement may be used to detect the user's iris. Then we an automated color matching process may be implements or the user can select the eye color. Once these steps are completed, the iris and pupil are replaced with the newly created ones.

In another embodiment, the iris and pupil are created by detecting the iris and then flipping it or duplicating the top from what is available on the bottom or vice versa.

Another example of a feature which may be replaced or added is teeth. Teeth are constructed similarly to eyes. The mouth is first defined with facial feature recognition software or by a user and then from the size of the mouth including height and width teeth that fit properly are dynamically generated. The teeth may also be fit by demographics, for example a young child, older male.

The method further provides for selecting variables for background and scenarios. The method optionally allows the user to change the backdrop of the image in its entirety, or add to an image, i.e., if it is a cloudy day, the user could add rain. In one embodiment, predefined variables for the different backgrounds, landscaping and scenarios are provided. The method further provides for the background, effecting the movements in the images to insure a more realistic three dimensional rendering. For example, if a sunny day background is chosen, or already depicted in the image, a different (faster) eye blinking speed is set than if it were a starry night scene. As discussed above, the user may customize the image, for example the user can change the motion variables if desired and not defer to the preset or pre-selected rates. In addition, the user may set a rate that is consistent for all movement in the image, either by selecting a preset rate or his own or the user can set the rates individually, for example all people in an image could blink at the same rate or each could blink at a different rate.

As described the motion setting of the method may be random, may be preset or may be user selected. If random motion is selected, the user simply manipulates the photograph with all of the customized variables and motions but the movement will be determined by the software at random.

In a similar manner to the motion setting, emotion generated movements may be set as well. For instance, if the user selects a happy emotion, the image will have its eyebrows raised in excitement, smile wider and more frequently, all still following random patterns, but with slightly more variables preset, whichever are necessary to form each emotion.

The motion settings for all of the objects in the frame may vary in intensity from object to object. The user can independently increase or decrease the intensity of the motion, both in speed and in range of movement.

The emotions, movements and other effects described here may be modified by pressing a button, either physical or in software to change states. For example, a button may be added to the frame to change from a happy facial expression to a sad one, either on the device itself or via software. This can be done to change backgrounds and effects, for example, transitioning from fall to winter to summer. Similarly, the audio effects added may be changed by pressing one button.

The various configurations, emotional states, and audio effects can all be stored as configurable presets in the embodiment of the invention to facilitate the previously described one button state changes.

Smooth motion transitioning is also provided for in embodiments of the present invention. Smooth motion transitioning provides for transitioning from one set of digital rendering criteria to another according to a set of rules. By implementing such processes, the user can transition from one motion to the next without motion degradation or loss of realism. For example, if the user is transitioning from happy to sad, the last key frame of the sad face is linked to the first key frame of the happy face. To create the smooth transition, the method generates the animation so that the end of the happy face comes close to a neutral face so that the start of the next one also looks seamless. Specifically, for example, frame "n" of a prior motion is set equal to frame 1 of the subsequent motion. As a result the movement does not skip or jump. Similarly, if a background is being transitioned for example falling snow fades out to a sunny day by waiting until last flakes have fallen before starting the sun coming out behind the clouds. Such transitioning creates the effect of provides for the animation going from one set of events to another seamless.

The method may further provide for reactive movement. Reactive movement generates cause and effect movements that are reactive to the dynamic three dimensional image and animated states. The selection of a certain motion can generate other dynamic movement. For example, if the user selects to have wind in a picture, or selects to create wind in the picture, as the wind blows across a person's clothing or hair, the hair will move and a wrinkle will form in the person's clothing. In another non-limiting example, if the image is holding an object and the hand moves, the object will also move with it and wobble, depending on the type of object (hard, soft, pliable, etc.). The sequence of the motion can be determined by the software logic or by the user. If wind motion is "blowing" from right to left, then objects in the photo or the digital frame are effected in the appropriate sequence. If the intensity of the wind is increased then the speed at which the objects are affected increases at an increasing rate. At top speed all objects appear to be affected or blowing simultaneously.

Reactive motions can also be a result of the environment of the image. For example, if the sun is shining in the image or if there is a bright light in the image such can be automatically detected or the user can select that the image is an outdoor image and then the rate of blinking, as described above, is faster, it is natural to blink faster or with greater frequency in the sun. In addition, as described above, the blinking may be staggered depending on all the people in the image. However, such default settings are not intended to be a limitation on the embodiments of the present invention and the user can create a rate of eyes blinking, or timing of blinking, or timing of different things that are separate from what is consider to be a preferably random motion.

In another embodiment, the three dimensional animation of the two dimensional image is created by causing the subjects in the image to react to external factors. For example, a digital frame or computer has a camera or motion sensor incorporated into it. The camera or motion sensor senses nearby stimuli and sends feedback to the processor which automatically adjusts the displacement map color causing the subject's behavior in the image to change, i.e., a head to turn or eyes to move.

A set of moods and states may be stored into behavioral file format for later rendering.

Further non-limiting applications include:

Three Dimensional Representation Mirroring Real World Stimulus in Real-Time

Using the disclosure and teaching herein a user can provide real world replication of movement and activity using motion sensors and cameras to guide the display. In this embodiment, the orientation, outline and movement picked up by motion sensors or cameras is mapped. Once mapped, the system can provide guidance to the animation engine to move the head, eyes, mouth and other elements of the programmed displacement map to replicate real world motion.

Avatar Representation in Virtual Worlds and Social Networks

A user can create avatars from their photographs that follow the mouse pointer around as they navigate, or alternatively can be configured to focus on points of interest on the screen and react upon actions. For example, an image of the sender an email message could be displayed when a new email is received from the send. The sender's image could then smile, or wink, at the recipient when the message is opened. In further embodiments, additional expressions and emotions may be used to convey urgency and priority of content, as well as adding additional states to indicate positive or negative feedback to the user's action including disapproval of talking to people that have poor or questionable reputations (spam content) or status as well as positive feedback and smiles for reacting to items and people that are viewed more favorably.

Three Dimensional Representation for Mobile Notifications and Call Origination and Termination Embodiments of the present invention enable a user to configure his telephone to create, send and received custom animations including emotional content for originating and terminating mobile calls. For example, a phone call can originate with the sender seeing the smiling face or sad face of the person they are calling to show their configurable emotional state, and theirs will be transmitted as part of the call. The person receiving the call sees the representation of the photograph sent and can react accordingly to a happy face, sad face or angry countenance. Additional state information and expressions can be programmed including the ability to determine local weather where appropriate and apply it to the image of the sender or receiver.

Three Dimensional Representation in Teleconferencing Systems

Users can create an image of themselves and apply parameters to the photograph for use in low bandwidth visual teleconferencing. In this embodiment a stream of visual programming data is transmitted through the network in parallel to the voice data to provide displacement information on the receiving end for the photo to convey mouth movements, head movements, and other expressions. The motions may be set via user programming as well as including cues from cameras and motion sensors on the part of the sender.

Three Dimensional Representation in Retail or Kiosk Systems

In one embodiment, using a captured photograph and representations of real world items, i.e., including, but not limited to, hats, earrings, and clothing items, a virtual store front is established. In addition, using the methods described herein, a background may be created to include furniture, decorations and exotic destinations. The users can determine what items they find appealing by using either a panel of buttons, a pointer device (mouse or trackball) or a touch screen to configure or exchange options. In addition to providing the initial photograph, the camera can be left in a position to be taking periodic snapshots of the user and attempt to extrapolate their satisfaction based on blinking, smiling, or nodding where appropriate. If the user is caught providing positive emotional feedback for configuring items, an appealing sound and/or animation may play in addition to a "purchase this now" discount to reinforce their purchasing decision. Conversely, no reaction, or a negative reaction, can prompt the display to suggest an alternative product, or a different color or option.

Three Dimensional Representation in Customer Service

In another embodiment, to encourage the use of online support as well as decrease the user frustration with the experience, customer service representatives can provide appealing images and animations to users to help make the experience more satisfactory. Furthermore, a three dimensional image of a customer service representative may be displayed in a chat screen. The image displayed could be that of the actual customer service representative, alternatively, based on demographic information, to make the experience more appealing to consumers the image could be adjusted appropriate or the user could select the image of the customer service representative with whom he wants to "speak." As the customer support incident is being handled the representative is then able to alternate their mood between happy and appreciative for their business as well as patient and waiting for some sort of system response to provide empathy and increase the customer's overall satisfaction by providing a more humane customer service experience.

Three Dimensional Animated Wallpaper

In another embodiment, a three dimensional animated image is adapted for use as a wallpaper on a smartphone, computer screen, or the like. The methods described herein enable a user to customize a two dimensional image to create wallpaper using the software format from the hardware manufacturer. In another embodiment, a smartphone displays a three dimensional animated image of an incoming caller. The image may optionally continue through the length of the call.

Make-Up Simulation

Embodiments of the present invention may also be implemented to simulate a cosmetic makeover. For example, when applying cosmetic products especially to a face, the paler the skin, digitally, the heavier the makeup needs to be applied. In contrast, the darker the skin tone, the lighter it needs to be applied. Hence, users are able to pick a skin tone and then customize the image by simulating the application of cosmetics so that the user can select products without the need to test samples at the cosmetic counter. In addition to allowing the user to try a variety of products, such embodiments prevent the user from having to risk the use of contaminated samples when trying to determine the appropriate color selection. Embodiments may also be used to instruct cosmetic application when instead of user selected controllers, preset controls are chosen to apply the make and select the colors. Further advantages of an animated make over include for example the ability to see how eye shadow looks on a user's eyelids these embodiments.

In another embodiment a digital photograph frame with preloaded software is provided wherein the image transformation is performed on the digital frame screen. In another embodiment, the image transformation software is installed on a computer and the frame is connected to the computer and the images downloaded on the frame. The image transformation software may be provided on a computer readable medium or made available for download over a network for installation on a client device.

Although the method described herein creates what appears to be an edited image, the original two dimensional image is not altered. The novel method creates layers of assets that are presented to the user or observer, as a result, the original image itself is not necessarily changed, but the presentation of the assets that are layered are changed. For example, if a plaid frame border that defaults to 10 pixels wide is selected by the user, the user could move that to frame to 5 pixels or drag it to 20 pixels and the frame will appear to change on the screen. The parameters selected are then changed on a layer that is presented with the image. The parameters of the layer are saved, but the modified image that is displayed is not saved, rather, the viewer sees a presentation of all of the layers combined.

In another embodiment, scenery and frames or other visual artifacts may be added to images. For example, an image may be modified to make it appear as though it was taken at the ocean, or by a building. This embodiment may also be used for travel marketing purposes. In one embodiment the new the background is dynamic while the image remains static. In another embodiment, both the background and the image are dynamic. For example, an image may be modified to have snow falling in the background, real snow and a real mountain and then the effect of wind blowing the hair be added. In another embodiment, dynamically changing scenery is provided. For example, a photo of a person by a tree is animated so that rain begins to fall. The raining falling effects the tree, and the image.

In another embodiment, animated effects as opposed to realistic effects are added. For example, old fashioned snowflakes falling.

In a further embodiment, line drawings or other effects can be added to a two dimensional image.

In another embodiment, a matte is added to an image. In contrast to traditional mats which are physical and surround an image, a digital map is added. Advantageously, the digital matte may be customized to each individual digital photograph. For example, if there are 30 images displayed on a digital frame, each digital image could have a different matte added to it, the same matte added to it, or a combination of similar and dissimilar mattes. The matte may be designed so that it overlays the image, alternatively the matte may crop the image. The mattes may be customized by color, texture, size thickness, text, etc. so that the digital matte appears realistic and is personalized, i.e., for the occasion or style of the room.

In this embodiment, the matte can be generated automatically, using elements of existing photos. Color schemes, patterns, symbols, and pieces of the image texture can be used from the source photo, or other photos to generate the matte. For example, a photo of a pink and white baby blanket with a bunny on its border could be presented and a matte may be generated that includes the bunny and the color scheme. Or, a matte may be automatically generated by selecting a desired color, color combination or color scheme from any photo or any scanned in object used as a photo, creating a like or color complementary matte(s).

The methods described herein may be implemented by a user accessing the software through an automated system such as a web based program that is accessible through a network or downloading software from a remote server to a client computer or installing software from a disc, CD, DVD, or other storage media. For example, a user could access a web based program which would guide the user through each step to create a three dimensional animation or alternatively, the user could download or install software on his local computer. Furthermore, the web-based or local based software could store a user's preferences and automatically apply such to future animations. Alternatively, the user could access the software by using hardware, for example a digital frame, on which the software is preinstalled.

As noted previously the forgoing descriptions of the specific embodiments are presented for purposes of illustration and description. They are not intended to be exhaustive or to limit the invention to the precise forms disclosed and obviously many modifications and variations are possible in view of the above teachings, including equivalents. The embodiments were chosen and described in order to explain the principles of the invention and its practical applications, to thereby enable those skilled in the art to best utilize the invention and various embodiments thereof as suited to the particular use contemplated.

The invention claimed is:

1. A non-volatile non-transitory computer readable storage medium containing instructions which when executed by a computing device transforms a two dimensional static image into a sequence of images that provide a three dimensional animated motion effect for the two dimensional static image by a method comprising the steps of:
   locating facial or head features on the two-dimensional image;
   generating a characterization of the located facial or head features on the two dimensional image using feature recognition software;
   generating an identification of elements other than facial or head features on the two dimensional image to be animated;
   generating displacement maps based on the characterization of the located facial or head features and the elements other than facial or head features to be animated, wherein the displacement maps are overlaid over the located facial or head features or the elements other than facial or head features to provide a coded motion system for creating one or more motion effects on the one or more facial or head features or on the elements other than facial or head features to be animated; and
   animating the one or more facial or head features or the elements other than facial or head features to be animated in the two dimensional image by creating one or more motion effects on the one or more facial or head features or the elements other than facial or head features to be animated based on the coded motion system provided by the displacement maps.

2. The computer readable medium of claim 1, wherein locating the facial features on the two dimensional image is performed manually.

3. The computer readable medium of claim 1, wherein locating the facial features on the two dimensional image is done using object recognition software.

4. The computer readable medium of claim 3, wherein after locating the facial features on the two dimensional images, a user is enabled to further adjust the location.

5. The computer readable medium of claim 1, wherein the two dimensional image is a digital photographic image.

6. The computer readable medium of claim 1, wherein the two dimensional image is a scanned photographic image.

7. The computer readable medium of claim 1, further comprising generating a background for the two-dimensional image.

8. An imaging display device which transforms a two-dimensional static image into a three-dimensional animated image comprising:
   at least one client device including a processing unit, a memory, and a bus capable of uploading or retrieving at least one two-dimensional photographic image;
   computer executable object recognition software for locating facial features on the at least one two-dimensional photographic image;
   computer executable facial feature recognition software for detecting shapes of the facial features on the at least one two-dimensional photographic image;
   a computer executable software module for creating displacement maps based on the characterization of the facial features, wherein the displacement maps are overlaid over the located facial features to provide a coded motion system for creating one or more motion effects on one or more facial features; and a computer executable software module for causing one or more facial features of the at least one two-dimensional image to animate based on the created displacement maps.

9. The imaging display device of claim 8, further comprising:
object recognition software for locating elements other than facial features on the at least one two-dimensional photographic image;
feature recognition software for detecting the shape of the elements other than facial features on the at least one two-dimensional photographic image;
a software module for creating displacement maps based on the characterization of the elements other than facial features; and
a software module for causing the elements other than facial features of the at least one two-dimensional image to animate based on the displacement maps.

10. The imaging display device of claim 8, wherein the at least one client device communicates over a network to an image management service, wherein the image management service comprises:
the object recognition software;
the facial feature recognition software;
the software module for creating displacement maps; and
the software module for causing one or more portions of the at least one two-dimensional image to animate based on the displacement maps.

11. The image display device of claim 8, further comprising an input device arranged to receive input from a user to refine the location and shape of the facial features on the at least one two dimensional photographic image.

12. An image processing system, said system comprising one or more processors;
and a non-volatile computer-readable storage medium carrying one or more sequences of instructions, for transforming a two-dimensional static image that includes at least one located facial feature to be animated into a sequence of images that provide a three dimensional animated motion effect for the two dimensional static image, said system further comprising:
facial recognition software encoded as a first sequence of instructions of the one or more sequences of instructions, which when executed by said one or more processors characterizes the at least one located facial feature on the two dimensional static image;
displacement maps generated by said one or more processors executing a second sequence of instructions of the one or more sequences of instructions, the displacement maps generated based on the characterization of the at least one located facial feature;
at least one coded motion system based on the displacement maps, wherein the displacement maps are overlaid over the at least one located facial feature or the elements other than the at least one facial feature; and
an animation module encoded as a third sequence of instructions of the one or more sequences of instructions, which when executed by said one or more processors causes the at least one located facial feature in the two-dimensional static image to animate based on the at least one color coded motion system.

13. The image processing system of claim 12, further comprising:
at least one element other than facial features to be animated in the two-dimensional static image;
movement recognition software encoded as a fourth sequence of instructions of the one or more sequences of instructions, which when executed by said one or more processors characterizes the at least one element other than facial features; and
displacement maps generated based on the characterization of the at least one element other than facial features; and
an animation module encoded as a fifth sequence of instructions of the one or more sequences of instructions, which when executed by said one or more processors causes the at least one element other than facial features in the two-dimensional static image to animate.

\* \* \* \* \*